US012803240B2

(12) United States Patent
Morrison et al.

(10) Patent No.: US 12,803,240 B2
(45) Date of Patent: Nov. 17, 2026

(54) ETALON VAPOR CELL FOR ATOMIC SENSING

(71) Applicants: Freedom Photonics, LLC, Santa Barbara, CA (US); Northrop Grumman Systems Corporation, Falls Church, VA (US)

(72) Inventors: Gordon Barbour Morrison, Summerland, CA (US); Brandon Isaac, Santa Barbara, CA (US); Mike Larsen, Ephraim, WI (US)

(73) Assignees: Freedom Photonics, LLC, Santa Barbara, CA (US); Northrop Grumman Systems Corporation, Santa Barbara, CA (US)

( * ) Notice: Subject to any disclaimer, the term of this patent is extended or adjusted under 35 U.S.C. 154(b) by 816 days.

(21) Appl. No.: 18/181,978

(22) Filed: Mar. 10, 2023

(65) Prior Publication Data

US 2023/0291170 A1 Sep. 14, 2023

Related U.S. Application Data

(60) Provisional application No. 63/318,515, filed on Mar. 10, 2022.

(51) Int. Cl.
*H01S 3/139* (2006.01)
*H01S 3/13* (2006.01)

(52) U.S. Cl.
CPC ........ *H01S 3/1392* (2013.01); *H01S 3/13017* (2019.08)

(58) Field of Classification Search
CPC .... H01S 3/1392; H01S 3/13017; G01R 33/26
See application file for complete search history.

(56) References Cited

U.S. PATENT DOCUMENTS 9,222,810 B1 * 12/2015 Okandan .............. G01B 9/0207
2006/0285569 A1 * 12/2006 Zhao ..................... G01J 1/4257
372/56

* cited by examiner

*Primary Examiner* — Christopher E Leiby
(74) *Attorney, Agent, or Firm* — Van Pelt, Yi & James LLP

(57) ABSTRACT

Configurations and method fabrication are disclosed for vapor cells used in atomic sensors. In particular vapor cells that include optical resonators. The disclosed configurations can utilize the optical resonance inside the vapor cells to enhance the interaction between laser beams and atoms contained in the vapor cell and enable controlling the temperature of the vapor cell.

19 Claims, 12 Drawing Sheets

1000

1100

ETALON VAPOR CELL FOR ATOMIC SENSING

INCORPORATION BY REFERENCE TO ANY PRIORITY APPLICATIONS

This application claims the benefit of priority of U.S. Provisional Application No. 63/318,515 titled "ETALON VAPOR CELL FOR ATOMIC SENSING", which was filed on Mar. 10, 2022, the entire disclosure of which is expressly incorporated herein by reference.

BACKGROUND

Field of the Invention

Various embodiments of this application relate to vapor cells used in atomic sensors. More specifically designs of optically interrogated vapor cells are described for reducing the size of the vapor cell and enhancing light-atom interactions inside the vapor cell.

Description of the Related Art

Optically interrogated vapor cells are frequently used in applications including but not limited to nuclear magnetic resonance (NMR) gyroscopes, magnetometers, ydberg electric field sensors, and atomic clocks, for atomic sensing. In many of these applications, smaller weight, size and power consumption of the system are desired. In some of these applications, one or more laser beams of various wavelengths are used to pump and/or probe the atoms inside a vapor cell, by interacting with various energy levels of the atoms. In various systems that use a vapor cell for atomic sensing, the performance of the system can be affected by the strength of the interaction between the laser beams and the atoms inside the vapor cell. The strength of the interaction between the laser beams and the atoms inside the vapor cell can be determined by the length or the effective length of the vapor cell (e.g., a length along which the laser beams interact with the atoms inside the vapor cell) and the intensity of the laser beams.

SUMMARY

A variety of optical devices are disclosed herein. Some such optical devices comprise vapor cells that include optically reflective surfaces configured to support optical resonance within the vapor cell and passively amplify the intensity of light beams interacting with atoms confined inside the vapor cell. Example embodiments described herein have several features, no single one of which is indispensable or solely responsible for their desirable attributes. Without limiting the scope of the claims, some of the advantageous features will now be summarized.

In one aspect an optical system comprises a first laser source configured to generate a first input laser beam having a first laser wavelength within an operating wavelength range of the optical system and an etalon vapor cell (EVC). The EVC comprises: a first reflective surface, a second reflective surface, a first etalon formed by the first reflective surface and the second reflective surface, the first etalon having a first length and a first plurality of transmission peaks and respective peak wavelengths, where a first transmission peak of the plurality transmission peaks comprises a spectral region centered at a first peak wavelength, the first transmission peak having a first cavity linewidth and a chamber containing atoms having a first atomic line, said first atomic line having a first atomic linewidth and a first peak atomic wavelength. An internal volume of the chamber at least partially overlaps with a resonant optical mode of the first etalon. The first input laser beam is incident on the first reflective surface, the first atomic line at least partially overlaps with the first transmission peak, and the first laser wavelength is within the first transmission peak and the first atomic line.

In another aspect an optical system comprises a first laser source configured to generate a first input laser beam having a first laser wavelength and an etalon. The etalon comprises a first reflective surface, a second reflective surface, and an optical cavity formed between the first reflective surface and the second reflective surface, the optical cavity having a plurality of transmission peaks and respective peak wavelengths, where a transmission peak of the plurality transmission peaks comprises a spectral region centered at a peak wavelength, the transmission peak having a cavity linewidth. The optical system comprises a second laser source configured to generate a second input laser beam having a second laser wavelength, where the second input laser beam is incident on an absorptive wall of the etalon. The absorptive wall comprises a material that absorbs light having the second laser wavelength, and an electronic controller configured to control a power of the second laser source to adjust a temperature of the etalon. Where the first input laser beam is incident on the first reflective surface and the first laser wavelength is within the first transmission peak.

In another aspect a method of measuring light-atom interaction comprises: providing a first wavelength tunable laser source configured to generate a first input laser beam having a first laser wavelength; providing an etalon vapor cell (EVC). The EVC cell comprises a first reflective surface, a second reflective surface, a first etalon formed between the first reflective surface and the second reflective surface, the first etalon having a first length and a first plurality of transmission peaks and respective peak wavelengths, where a first transmission peak of the plurality transmission peaks comprises a spectral region centered at a first peak wavelength, the first transmission peak having a first cavity linewidth The EVC cell further comprises a chamber containing atoms, said atoms having a first atomic line, said first atomic line having a first atomic linewidth and a first peak atomic wavelength; where an internal volume of the chamber at least partially overlaps with a resonant optical mode of the first etalon. The first length is configured such that the first transmission peak at least partially overlaps with the first atomic line. The method further comprises directing the first input laser beam to the first reflective surface such that it becomes incident on the first reflective surface at a first angle of incidence; providing a temperature control system configured to at least control spectral positions of the first plurality of transmission peaks by controlling the temperature of the EVC; adjusting the first peak wavelength such that a spectral distance between the first peak atomic wavelength and the first peak wavelength is less than 10% of the first cavity linewidth.

In another aspect a method of fabricating an optical device comprises: providing a core layer having a top surface and a bottom surface substantially parallel to the bottom surface, said core layer comprising at least one opening extended from the top surface to the bottom surface; providing a first layer having a first inner surface and a first outer surface, and disposing a first antireflection layer on a first region of the first inner surface; providing a second layer having a second inner surface and a second outer surface, and disposing a second antireflection layer on a first region of the second inner surface. The method further comprises bonding a second region of the first inner surface to the top surface; and bonding a second region of the second inner surface to the bottom surface. The first and second regions of the first inner region are non-overlapping, and the first and second regions of the second inner surface are non-overlapping.

In another aspect a method of fabricating an optical device comprises: providing a core layer having a top surface and a bottom surface substantially parallel to the bottom surface, said core layer comprising at least one opening extended from the top surface to the bottom surface; providing a first layer having a first inner surface and a first outer surface, and disposing a first reflective layer on a first region of the first inner surface; providing a second layer having a second inner surface and a second outer surface, and disposing a second reflective layer on a first region of the second inner surface. The method further comprises bonding the first inner surface to the top surface, and bonding the second inner surface to the bottom surface. The first and second regions of the first inner region are non-overlapping, and the first and second regions of the second inner surface are non-overlapping.

In another aspect an optical device configured to allow interaction between one or more laser beams and atoms contained in the optical device, the optical device comprising: a first reflective surface, a second reflective surface, at least one etalon formed between the first reflective surface and the second reflective surface, the first etalon having a roundtrip length and a plurality of transmission peaks and respective peak wavelengths, where a first transmission peak of the plurality of transmission peaks comprises a spectral region centered at a first peak wavelength, the first transmission peak having a first cavity linewidth. The chamber comprising the first and the second reflective surfaces, the chamber containing the atoms, said atoms having a first atomic line, said first atomic line having a first atomic linewidth and a first peak atomic wavelength. The spectral reflectance of at least one of the first and the second reflective surfaces comprises at least one high reflectivity spectral region and a low reflectivity spectral region, where the reflectance of the at least one of the first and the second reflective surfaces for wavelengths within the high reflectivity spectral region is larger than 70% and the reflectance of the at least one of the first and the second reflective surfaces for wavelengths within the low reflectivity spectral region is smaller than 20%.

BRIEF DESCRIPTION OF THE DRAWINGS

In the following description of the various embodiments, reference is made to the accompanying drawings which form a part hereof, and in which is shown by way of illustration various embodiments of the device. It is to be understood that other embodiments may be utilized and structural changes may be made.

DETAILED DESCRIPTION

Figure 1A:
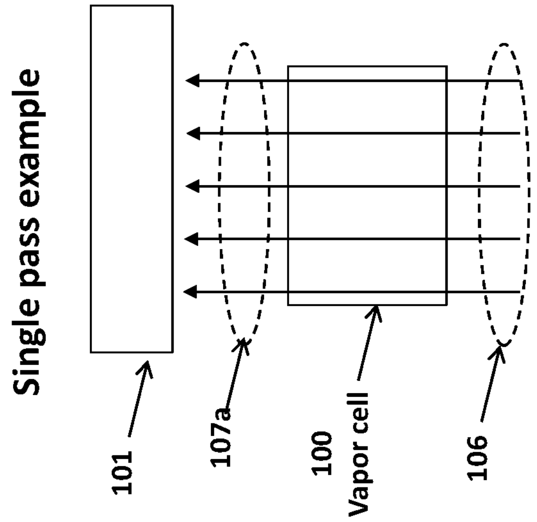
FIG. 1A illustrates an optical arrangement that supports single pass optical transmission through a vapor cell.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied using a variety of techniques including techniques that may not be described herein but are known to a person having ordinary skill in the art. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein. It will be understood that when an element or component is referred to herein as being "connected" or "coupled" to another element, it can be directly connected or coupled to the other element or intervening elements may be present therebetween. For clarity of description, "reflector" or "mirror" can be used interchangeably to refer to an optical element and/or a surface having a reflectivity (or reflectance) greater than or equal to about 0.01% and less than or equal to 100%. For example, an optical element and/or a surface having a reflectivity (or reflectance) greater than or equal to about 5% and less than or equal to 99%, greater than or equal to about 10% and less than or equal to 90%, greater than or equal to about 15% and less than or equal to 80%, greater than or equal to about 20% and less than or equal to 70%, greater than or equal to about 30% and less than or equal to 60%, or any value in any range/sub-range defined by these values can be considered as a reflector or mirror. It will be understood that "light having single wavelength", "laser light having single wavelength", "single wavelength light" or "single wavelength laser light", can be light comprising wavelengths within a wavelength or frequency band (e.g., a narrowband) centered at a center wavelength (or center frequency). It will be understood that reflectance of a passive surface can be a value from 0% to 100% and cannot exceed 100%.

Vapor cells are sealed chambers or containers containing a vapor or gas sample at a certain pressure that allow interaction between the gas or vapor and a beam of light (e.g., laser light). The vapor or gas may comprise atoms of the same or different types. The vapor cell may include at least two transparent windows allowing transmission of the beam of light through the vapor and its interaction with the atoms inside the cell. Vapor cells are frequently used in many applications including those that require a stable frequency reference or those that rely on the interaction of a beam of light with atoms. Examples of these applications may include but are not limited to nuclear magnetic resonance (NMR) gyroscopes, magnetometers, Rydberg electric field sensors, and atomic clocks, for atomic sensing. In many of these applications, vapor cells that enable strong light-atom interaction in a small volume and using lower optical intensities are desired. In some cases, a first beam of light (pump beam) may excite the atoms, and a second beam of light (probe beam) may interact with the excited atoms. In some such cases, enhanced interaction of the first and/or the second beam with the atoms may be desired.

Figure 1B:
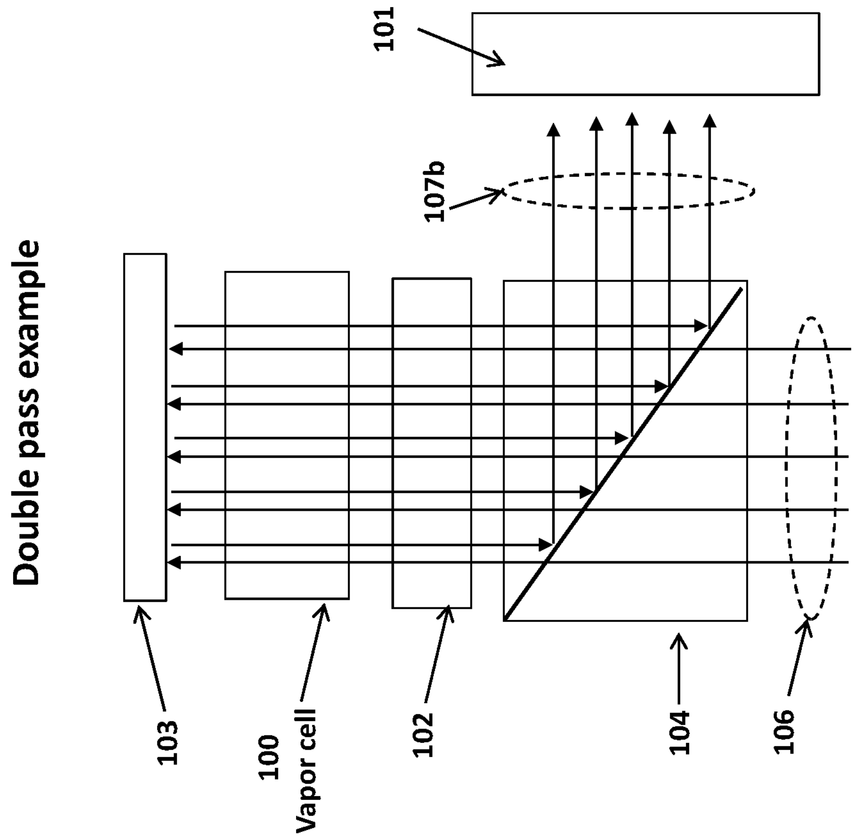
FIG. 1B illustrates an optical arrangement that supports double pass optical transmission through a vapor cell.

FIG. 1A and FIG. 1B illustrate example optical arrangements that may be used to enable transmission of an input light beam 106 (e.g., a laser beam) through a vapor cell 100, and measuring the power or intensity of the transmitted light beam 107*a* (or 107*b*) using a detector 101 (e.g., a photodetector that converts optical intensity to electric current). In some cases, the wavelength of the input light beam 106 can be within an operational wavelength range of the vapor cell 100. In some examples, the operational wavelength range of a vapor cell may comprise a wavelength range that includes wavelengths associated with one or more atomic transitions of the at least one type of atom included in the cell. In some cases, the detector 101 may comprise a photodiode or an amplified photodiode that generates a photocurrent proportional to the intensity of the transmitted light beam 107*a* (or 107*b*). In some cases, the detector 101 may further comprise other optical components such as polarizing beam splitters and/or additional photodiodes for polarimetry detection. In some cases, the detector 101 may be replaced by a beam splitter (e.g., a polarizing beam splitter) that receives the output light beam 107*a* (or 107*b*) and redirects a first portion the output light beam 107*a* (or 107*b*) to a first detector and a second portion of the output light beam 107*a* (or 107*b*) to a second detector. The photocurrents generated by the first and the second detector in response to receiving light, may be used to determine a polarization state of the output light beam 107*a* (or 107*b*)

In some cases, the configurations shown in FIG. 1A and FIG. 1B may be used in an atomic sensor. In some cases, two light beams having different wavelengths or polarization states may enter a single vapor cell and interact with different atomic transitions of the atoms of the same or different types contained inside the vapor cell. In various implementations below, an input light beam may comprise a beam of light (e.g., a beam of laser light) incident on a vapor cell. In some cases, the input light beam may comprise an input laser beam having a laser wavelength. The spectrum of the laser beam may comprise wavelengths included within a bandwidth (referred to as "laser linewidth") centered at the laser wavelength.

The example shown in FIG. 1A is a single pass configuration where the light 106 (e.g., a laser beam) passes through the vapor cell 100 one time before being detected by the detector 101. In some cases, the vapor cell 100 may comprise an input surface through which the input laser beam 106 enters the vapor cell 100 and an output surface from which the laser beam transmitted through the vapor cell 100 exits the vapor cell 100. In some examples, the interaction between a laser beam and the atoms in a vapor cell 100 may be enhanced using a reflector (e.g., a retroreflector) that reflects the transmitted laser beam, that has passed through the vapor cell once, back to the vapor cell 100 so that it passes through the vapor cell 100 a second time before being detected and measured by the a detector. In various implementations, the reflector can be an external optical reflector placed near the output surface of the vapor cell 100 where light transmitted through the vapor cell 100 exits the cell. In some cases, the output surface of the vapor cell 100 may comprise a reflective surface that reflects light transmitted through the vapor cell 100 once, back toward the input surface of the vapor cell 100. FIG. 1B shows an example of a double pass optical arrangement. In the example shown, the input laser beam 106 can be a polarized beam (e.g., a linearly polarized beam). In some cases, before becoming incident on the vapor cell 100, the input laser beam 106 may pass through a polarization beam splitter 104, and a quarter waveplate that alters its polarization state. For example, when the input laser beam 106 is linearly polarized, the laser beam transmitted via the quarter wave plate may become circularly polarized. The laser beam transmitted through the quarter waveplate may then pass through the vapor cell 100 and become incident on a reflector 103 (e.g., a mirror having a reflectivity larger than 70%, 80%, 90%, 95%, 99%, 99.99%, or larger (but not larger than 100%), at a wavelength the input laser beam 106) that reflects the laser beam back to the vapor cell 100. In some cases, the reflector 103 can have a reflectivity from 70% to 80%, from 90% to 95%, from 99% to 99.99%, from 99.99% to 99.999%, or any range formed by any of these values or may be possibly smaller or larger. After passing through the vapor cell 100 for the second time, the reflected laser beam may pass through the quarter wave plate 102 for a second time and become incident on the polarizing beam splitter 104. In some cases, the second transmission via the quarter waveplate 102 may change the polarization state of the reflected laser beam such it is redirected by the polarizing beam splitter 104 toward the detector 101. For example, after transmission via the quarter wave plate 102, the reflected laser beam may have a linear polarization that is rotated by 90 degrees with respect to the polarization of the laser beam transmitted through the vapor cell 100 and incident on the reflector 103. In some cases, the interaction between the laser beam and the atoms in the vapor cell 100 may be further enhanced by passing the laser beam through the vapor cell, a third, fourth, or fifth time, or more by redirecting the laser to the vapor cell multiple times. However, such multi-pass configuration may need larger vapor cells to support interaction with laser beams that may be redirected to the vapor cell through non-overlapping optical paths. It should be understood that while such multipass configurations increase the interaction length of light with atoms, the intensity of light inside the cavity in each pass is lower than the intensity of the input beam 106. Moreover, the light beams associated with different passes may not overlap or interfere with each other.

In some implementations, the optical arrangements shown in FIG. 1A and FIG. 1B may include additional components such as magnetic shields, magnets, magnetic coils, mechanical fixtures, and other mechanical, electrical, or optical components.

Optically Resonant Vapor Cells

In various applications, it may be desirable to enhance an interaction between a laser beam and the atoms inside a vapor cell without significantly increasing the size of the vapor cell. Various designs and implementations disclosed herein may be used to enhance the interaction between a light beam (e.g., a laser beam) and the atoms inside a vapor cell that may not be larger than a vapor cell designed to support single or double pass arrangement. In some examples, the configurations described below may be used to increase the intensity of light (e.g., laser light) inside a vapor cell without increasing the intensity of the input laser beam (laser beam incident on the vapor cell).

In various implementations, a vapor cell may comprise a chamber (e.g., a hermetically sealed chamber) containing a vapor (e.g., an atomic vapor). The vapor may comprise a plurality of atoms of the same type or different types. The chamber may have different shapes and sizes. The atoms in a vapor cell may be in vapor or gas form.

In some cases, the vapor cell may comprise one or more cell walls forming the chamber. In some such cases, the chamber may comprise an internal surface of a cell wall. In various implementations, a cell wall may comprise a flat or a curved surface. In some examples, a cell wall may be optically transmissive in an operational wavelength range of the vapor cell. In some examples, a vapor cell (or the chamber of a vapor cell) may comprise at least two cell walls facing each other. In some cases, at least a portion of a cell wall facing another cell wall can be parallel to a portion of the other cell wall. In some cases, the vapor cell may have a rectangular or square shape cross-section in a first plane perpendicular to the direction of propagation of an input laser beam, and/or in a second plane perpendicular to the first plane. In some cases, the vapor cell may have a length along the direction of propagation of an input laser beam. In some cases, the vapor cell may have a width perpendicular to the direction of propagation of an input laser beam.

In some cases, the atoms included in the vapor cell may comprise Rubidium (Rb), Cesium (Cs), or other atoms. In some cases, additional atoms such as Xenon (Xe) may be included in the vapor cell, e.g., to modify certain properties of the energy levels of the Rb or Cs atoms. In some cases, a gas or a vapor contained in the vapor cell may comprise atoms of two or more different types.

The designs and configurations disclosed herein may be used in variety of atomic sensors and systems that may use the interaction between one or more light beams (e.g., laser beams) and atoms (of the same or different types) in a vapor cell for at least part of their operation. Examples of atomic sensors may include but not limited to: magnetometers, gyroscopes, Rydberg e-field sensors, and atomic clocks. These atomic sensors may benefit from the strong light-atom interaction resulting from a higher intensity of light (e.g., laser light). In some cases, the intensity of light inside the cavity may be increased without increasing the power of a light source (e.g., laser source), that generates the input light beam (e.g., laser beam) outside of the vapor cell.

The disclosed vapor cell designs may allow fabricating vapor cells that are smaller, support improved coupling between the atoms and the laser beams, and/or can operate at lower optical powers, e.g., compared to commercially available and conventional vapor cells (e.g., non-resonant vapor cells).

In some implementations, a vapor cell may comprise an optically resonant vapor cell that supports optically resonant modes inside the cell. In some examples, an optically resonant vapor cell may comprise one or more reflective surfaces (e.g., surfaces comprising a reflective coating) forming an optical cavity that supports resonant optical modes inside the vapor cell and within the chamber of the vapor cell where gas molecules are entrapped. In some cases, an optically resonant vapor cell may comprise an Etalon interferometer (herein referred to as etalon). Such vapor cells may be referred to as Etalon vapor cells (EVCs). In some cases, the chamber of an EVC may be positioned at least partially within an optical cavity (e.g., an etalon) such that at least a portion of the volume of the chamber overlaps with an optical mode formed within the optical cavity. In some cases, the chamber may comprise at least one of the reflective surfaces that form the Etalon interferometer. In some cases, the chamber may comprise a plurality (e.g., two) reflective surfaces that form the Etalon interferometer. In some cases, the Etalon interferometer may comprise at least one outer surface of a cell wall of the chamber where an internal volume of the chamber (e.g., where the atoms or molecules reside) is at least partially bound by the corresponding inner surface of the cell wall. In some cases, the Etalon interferometer may comprise a plurality (e.g., two) outer surfaces of a cell wall of the chamber where an internal volume of the chamber (e.g., where the atoms or molecules reside) is at least partially bound by the corresponding inner surfaces of the respective cell wall. In some cases, the Etalon interferometer may comprise at least one inner surface of a cell wall of the chamber where an internal volume of the chamber (e.g., where the atoms or molecules reside) is at least partially bound by the corresponding inner surface of the cell wall. In some cases, the Etalon interferometer may comprise a plurality (e.g., two) inner surfaces of a cell wall of the chamber where an internal volume of the chamber (e.g., where the atoms or molecules reside) is at least partially bound by the inner surfaces of the respective cell wall. In some cases, the input and output surfaces of a vapor cell may comprise reflective surfaces. In some cases, two reflective surfaces may be parallel and face each other. In some such cases, at least a portion of a first reflective surface may be parallel to a portion of a second reflective surface facing the first reflective surface. In some cases, a length of the EVC may be a distance between the two parallel reflective surfaces that form the etalon cavity, along a direction perpendicular to the reflective surfaces. In some cases, a reflective surface of the EVC may comprise a surface of a cell wall. In various implementations, a reflective surface may comprise a curved reflective surface or a flat reflective surface. In some examples, an EVC may enhance the interaction between at least one input light beam (e.g., an input laser beam) having a wavelength within an operation wavelength range of the EVC with at least one type of atom having an absorption line within the operation wavelength range of the EVC.

In some embodiments, a reflective surface of the EVC may comprise a partially reflective (PR) or highly reflective (HR) coating. In some examples, a reflective coating may comprise one or more layers (e.g., a multilayer stack) disposed a surface of a wall. In some cases, a reflective coating may comprise dielectric layers. In some cases, the dielectric layer may comprise $TiO_2$, $Ta_2O_5$, $SiO_2$, SiN, MgF, $Al_2O_3$, Si, or other dielectric materials. In some cases, a reflective coating may comprise a metallic layer. In some such cases, the dielectric layer may comprise gold, aluminum, copper, or other metals. In some cases, the reflective coatings may be disposed on two EVC cell walls that face each other. In various implementations, a reflective coating may be disposed on an inner surface (e.g., a surface in contact with the vapor) or on an outer surface of a cell wall (e.g., a surface in contact with the medium surrounding the vapor cell). In some implementations, one or more surfaces of an EVC may comprise anti reflection (AR) coatings. For example, if a first surface of a cell wall is coated with an HR coating, a second surface of the same cell wall facing the first surface may be coated with an AR coating to avoid optical resonance within the thickness of the cell wall. In some cases, an internal surface of a cell wall that is in contact with the vapor may comprise a reflective surface and its external surface (e.g., the surface opposite to the internal surface), may comprise an antireflection coating. In some cases an internal surface of a cell wall that is in contact with the vapor may comprise an antireflection coating and its external surface (e.g., the surface opposite to the internal surface), may comprise a reflective surface. In some such cases, a reflective surface can have a reflectance larger than 60%, 70%, 80%, 90%, 95%, 99%, 99.9%, 99.999% or larger (but not larger than 100%), for light having wavelength in an operational wavelength range of the vapor cell. For example, the reflective surface can have a reflectance from 60% to 70%, from 80% to 90%, from 95% to 99%, from 99.9% to 99.999% or any range formed by any of these values or may be possibly smaller or larger (but not larger than 100%), for light having wavelength in an operational wavelength range of the vapor cell. In some example, the operational wavelength range of the vapor cell may comprises a wavelength range that included wavelengths associated with one or more atomic transitions of the at least one type of atom contained in the vapor cell. In some such cases, an antireflection coating may have a reflectivity smaller than 10%, smaller than 5%, smaller than 1%, or smaller values (but potentially larger than 0%) for light having wavelengths within the operational wavelength range of the vapor cell.

In some cases, an Etalon vapor cell (EVC) may comprise a first reflective surface through which an input laser beam enters the EVC and a second reflective surface from which an output laser beam or a transmitted laser beam exits the EVC. In some cases, the reflectance of the first and the second reflective surfaces can be different or substantially equal. In various implementations, the first and the second reflective surfaces may form an optical cavity (or an optical resonator) that supports formation of resonant optical modes inside the EVC. In some cases, the optical cavity may comprise an etalon interferometer. At least one optical resonant mode of the etalon can at least partially overlap with a an internal volume of a chamber of the EVC that contains atoms and molecules and thereby interact with the atoms and molecules.

Figure 2:
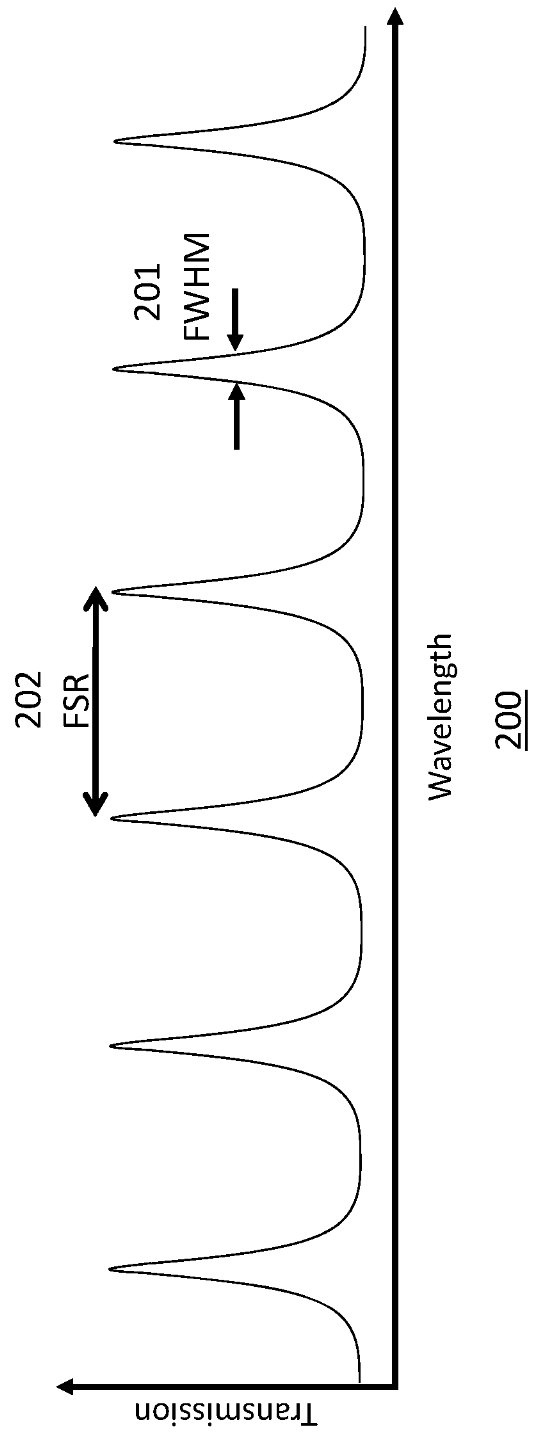
FIG. 2 illustrates an example optical transmission spectrum of an etalon interferometer.

Similar to a typical etalon interferometer, the optical spectrum of light (e.g., laser light) transmitted through the EVC may comprise at least one series of equally spaced transmission peaks in wavelength (or frequency) domain. FIG. 2 illustrates an example optical transmission spectrum 200 of an EVC. A transmission peak may comprise a portion of the optical spectrum centered (e.g., symmetrically centered) around a peak wavelength and may have a full-width-half-maximum (FWHM) 201 also referred to as cavity linewidth or cavity linewidth. The wavelength spacing (FSR) 202 between the peak wavelengths of two consecutive transmission peaks may be referred to as Free Spectral Range (FSR) of the etalon or etalon vapor cell. In some cases, FSR 202 may be determined by the optical path length (also referred to as optical path length of the cavity) between the two reflective surfaces of the EVC (e.g., a longitudinal distance between two reflective surfaces that form the cavity or the length of the EVC, e.g., along a direction substantially perpendicular to the reflective surfaces). In some cases, the FSR 202 may be determined by a roundtrip length of the EVC or etalon. The roundtrip length can be a distance travelled by an optical beam inside the etalon or EVC from the first reflective surface (the input surface) to the second reflective surface (the output surface), and back to the first reflective surface. In some cases, the roundtrip length of the cavity can be two times the optical path length of the cavity. The full-width-half-maximum (FWHM) 201 of a transmission peak may be determined by the reflectivity of the corresponding reflective surfaces of the EVC. The ratio between FSR and FWHM of the transmission peaks may be referred to as the Finesse of the EVC. In various implementations, an operational wavelength range of the EVC can be a wavelength range within which the FWHM of the transmission peaks included in the wavelength range is smaller than a threshold value. In some examples, FWHM of the transmission peaks within the operational wavelength range can be from less than 20 GHz, less than 10 GHz, less than 5 GHz, and less than 1 GHz. In some implementations, the FSR of an EVC can be from 1 GHz to 10 GHz, from 10 GHz to 50 GHz, from 50 GHz to 100 GHz, from 100 GHz to 200 GHz or any combination of these ranges or larger or smaller values (but potentially larger than 0). In some implementations, the FWHM of the transmission peaks may be chosen to be larger than 5, 10, 50, 100, or 1000 times a linewidth of an atomic linewidth of interest, but not larger than the FSR of the corresponding etalon. In some cases, an atomic feature (or an atomic line) of interest may comprise an atomic transition. In some implementations, the transmission peak can be sufficiently broad compared to the width of the atomic feature of interest such that the a relative change in optical transmission through EVC over the bandwidth of the atomic feature (e.g., an atomic line) is less than 20%, less than 10%, less than 1%, less than 0.1%, less than 0.01%, or smaller values (but potentially larger than 0) or any range formed by any of these values.

In some implementations, the position of the transmission peaks (and the peak wavelengths) in wavelength domain can be shifted to lower or higher wavelengths by tuning the temperature of the EVC (e.g., the temperature of the cell walls and/or the temperature of the vapor) or by changing the angle of incidence of the input laser beam (e.g., a laser beam incident on a cell wall of the EVC) with respect to a reflective surface of the etalon on which the laser input beam is incident. In some cases, the angle of incidence or the input laser beam can be from 0 to 0.1 degrees, from 0.1 to 0.5 degrees, from 0.5 to 1 degrees, from 1 to 3 degrees, from 3 to 5 degrees, from 5 to 10 degrees, from 10 to 15 degrees or any range formed by or between any of these values or may be smaller or larger.

In various implementations, the angle of incidence of the input laser beam on a cell wall may be controlled by rotating the EVC around an axis substantially parallel to the reflective surfaces of the EVC, or by rotating the input laser beam.

In some examples, the distance between the two reflective surfaces of the EVC in a direction perpendicular to the reflective surfaces may be configured such that at least one transmission peak of the EVC at least partially overlaps with an atomic line of an atom contained in the EVC.

Similar to an Etalon interferometer, when the wavelength of the input laser beam (laser wavelength) incident on the EVC is within a transmission peak of the Etalon, the portion of light that passes through the first reflective surface may become resonant inside the EVC and form a resonant light beam inside the EVC having an intensity larger than the intensity of the incident light beam or the input laser beam. In some examples, light having wavelengths within a transmission peak of the EVC (e.g., within the cavity linewidth or FWHM of the transmission peak) passes through the first reflective surface, it is recirculated within the EVC by the two reflective surfaces and forms a standing wave within the EVC. In some cases, the optical intensity (e.g., a peak optical intensity) of the standing wave formed inside the EVC can be larger than the optical intensity of the input laser beam.

At any wavelength within a transmission peak (e.g., a wavelength different than the peak wavelength by less than 50%, 70%, or 100% of the FWHM of the transmission peak or any range formed by any of these values) the ratio between the intensity of light inside the EVC (e.g., light circulating inside the EVC), and the intensity of input laser beam, herein referred to as enhancement factor, may be partially determined by the reflectance of the reflective surfaces of the EVC. Additionally, the enhancement factor of the EVC may be controlled by optical absorption of the cell walls and the atoms inside the EVC. In some cases, the enhancement factor of the EVC for an input laser beam having a wavelength substantially equal to a peak wavelength, can be larger than the enhancement factor of the EVC for laser beams having other wavelengths. In some cases, the enhancement factor of the EVC may be inversely proportional to a difference between the laser wavelength and a peak wavelength of the EVC. In some cases, the enhancement factor of the EVC for a laser beam having a laser wavelength within a transmission peak of the EVC may increase as a difference between the laser wavelength and the peak wavelength of the transmission peak is decreased.

In some cases, the reflectance of the first and the second reflective surface can be from 40% to 60%, from 60% to 80%, from 80% to 90%, from 90% to 99.9%, from 99.9 to 100%, or any range between or formed by any of these values or possibly smaller or larger.

Figures 3A, 3B:
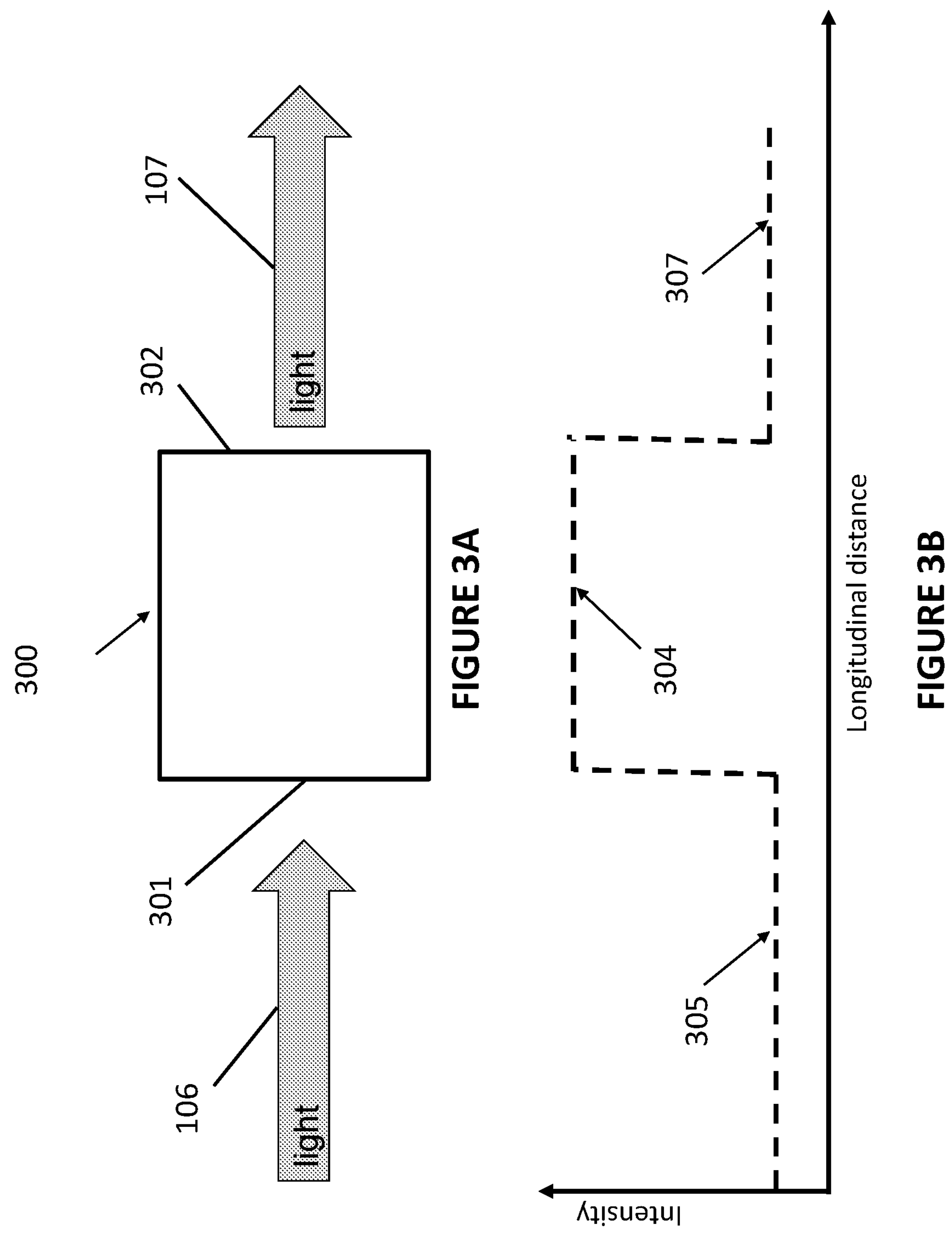
FIG. 3A illustrates transmission of light through an etalon interferometer.
FIG. 3B illustrates the variation of optical intensity along an optical path passing through the etalon vapor cell shown in FIG. 3A.

FIG. 3A illustrates an input light beam (e.g., a laser beam) 106 incident on an entrance cell wall 301 (e.g., the input surface) of an EVC 300 and the resulting output light beam exiting the EVC 300 via an exit cell wall or surface 302 (e.g., the output surface of the EVC). The entrance cell wall 301 and the exit cell wall or surface 302 each may comprise at least one reflective surface. For example, the internal or external surfaces of the entrance sidewall 301 and/or the exit sidewall or surface 302 may comprise a reflective coating. FIG. 3B illustrates the intensity of light inside and outside the EVC 300 plotted along a longitudinal direction parallel to the direction of propagation the input laser beam 106. The dashed lines illustrate the average optical intensity at different positions along an optical path passing through the EVC 300. As described above, the average optical intensity 304 inside the EVC can be larger than the intensity 305 of the input laser beam 106 and the intensity 307 of the output laser beam 107.

In various designs and configurations disclosed herein, the enhancement of the optical intensity inside an EVC may be used to enhance an interaction between the atoms inside the EVC and the laser light (e.g., a portion of input laser beam transmitted into the etalon). In some cases, to obtain a larger enhancement factor, the wavelength of the input laser beam may be close a peak wavelength of the EVC. For example, a spectral distance between the wavelength of the input laser and the peak wavelength of the EVC can be less than 70%, 50%, 40%, 30%, 20%, 10%, 5%, 1%, 0.1% of the cavity linewidth, or any ranges formed by any of these values or possibly smaller values. In some cases, the interaction between an atom and the laser light may comprise interaction between an atomic line and the laser line. A laser line may comprise a narrow distribution of optical power emitted by the laser having a peak at a laser wavelength and a full-width-half-maximum (FWHM) equal to the laser linewidth.

In some cases, the interaction between an atom or atoms inside the EVC and the laser light may comprise absorption of laser light by the atom. In some such cases, the laser line may overlap at least partially with an absorption line of the atom. The absorption line may have a peak absorption wavelength and an absorption linewidth equal to the FWHM of the absorption line.

In some cases, the interaction between an atom or atoms inside the EVC and the laser light may comprise rotation of a polarization direction of the laser light by the atom. In some such cases, the laser line may overlap at least partially with a polarization rotation line of the atom. The polarization rotation line may comprise a peak polarization rotation wavelength and a polarization rotation linewidth equal to the FWHM of the polarization rotation line.

In some cases, the interaction between an atom or atoms inside the EVC and the laser light may comprise optical transmission associated with electromagnetically induced transparency (EIT) line. The EIT line may comprise a peak EIT wavelength and an EIT linewidth equal to the FWHM of the EIT line.

In some implementations, a laser line may overlap at least partially with an atomic line of the atom. In some such implementation, the atomic line may comprise an absorption line or a polarization rotation line of the atom. An atomic line may have a peak atomic wavelength and an atomic linewidth. The peak atomic wavelength may comprise the peak absorption wavelength of the absorption line, or the peak polarization rotation wavelength of the polarization rotation line. The atomic linewidth may comprise the absorption linewidth of the absorption line or the polarization rotation linewidth of the polarization rotation line. In some examples, the atomic line may comprise an EIT line, the peak atomic wavelength may comprise the corresponding peak EIT wavelength, and the atomic linewidth may comprise the EIT linewidth.

In various implementations, to support a strong interaction between the laser beam and the atom inside the EVC, at least one peak wavelength of the EVC may be close, or substantially equal to a peak atomic wavelength of the atom, and the laser wavelength may be tuned to be close or substantially equal to the peak wavelength of the EVC. In some cases, the laser wavelength, the peak wavelength of the EVC and the peak atomic wavelength of the atom can be close or substantially equal. In some cases, an atomic line of an atom contained inside the EVC may overlap (at least partially) with a transmission peak of the EVC. In some such cases, the wavelength of the input laser beam may be within the overlap wavelength region between the transmission peak of the EVC and the atomic line. In some cases, a difference between the peak atomic wavelength and the peak wavelength (peak transmission wavelength of the EVC), can be smaller than 100%, 90%, 80%, 70%, 60%, 50%, 40%, 30%, 20%, 10%, 5%, 1%, 0.1%, or 0.01% of the FWHM of the cavity (cavity linewidth) or any range formed by any of these values or possibly smaller. In some cases, the difference between the peak atomic wavelength and the wavelength (e.g., laser wavelength) of the input laser beam can be smaller than 500%, 300%, 200%, 100%, 50%, 30%, 10%, 5%, 1% of the atomic linewidth or any range formed by any of these values or possibly smaller or larger values. In some cases, the difference between the peak wavelength and the wavelength of the input laser beam can be smaller than 100%, 50%, 30%, 10%, 5%, or 1% of the FWHM of the cavity (cavity linewidth) or any range formed by any of these values or possibly smaller or larger values.

In some cases, the cavity linewidth may be larger than an atomic linewidth. In some applications, the interaction between the input laser beam and atoms may be required over a large portion of an atomic line (e.g., a wavelength interval larger than 10%, 20%, 30%, 50%, or 100% or 500% of the linewidth of the atomic line but smaller than two times the cavity linewidth or any range formed by any of these values). In some such examples, the FWHM of the EVC transmission peak may be larger than the linewidth of the atomic line (atomic linewidth) by a factor of 2, 4, 6, 10, 50, 100, 500, 1000, 104, 106, or 109, but potentially smaller than 1030 or any range formed by any of these values. In some cases, factors of several hundred or a thousand may be quite typical, e.g., the linewidth of the atomic line can be 20 MHz and the cavity linewidth can be 5-25 GHz. In some cases, the FWHM of a transmission peak of the EVC (cavity linewidth) may be such that in the absence of any atomic absorption near the transmission peak, the variation of transmitted optical power through the EVC across a wavelength range within which an atomic feature of interest (e.g., an atomic line) changes between a peak value and 50% of the peak value, is less than 20%, less than 10%, less than 5%, less than 1%, less than 0.1%, less than 0.01%, or any range formed by any of these values or possibly smaller. In some such cases, the cavity linewidth can be large enough so that small adjustments (e.g., less than 50%, less than 30%, less than 10%, less than 5% of the atomic linewidth, or any range formed by any of these values or possibly smaller), of the laser wavelength near the peak atomic wavelength of the atomic line does not affect the enhancement factor of the etalon.

Examples of such applications may include applications that require locking the laser input to an atomic line. In some cases, the atomic line (e.g., atomic transition line or absorption line), may be associated with an atomic state that is being pumped or probed, by the input laser beam or is coupled (e.g., strongly coupled) to the input laser beam. In some cases, a FWHM of the EVC transmission peak (the cavity linewidth), can be large enough to allow tuning of the wavelength of the input laser beam over a wavelength interval around the peak absorption wavelength of the absorption line of the atom. In some such cases, the transmitted optical power through the EVC may not change significantly as the wavelength of the input laser beam is tuned over the wavelength interval.

Figure 4B:
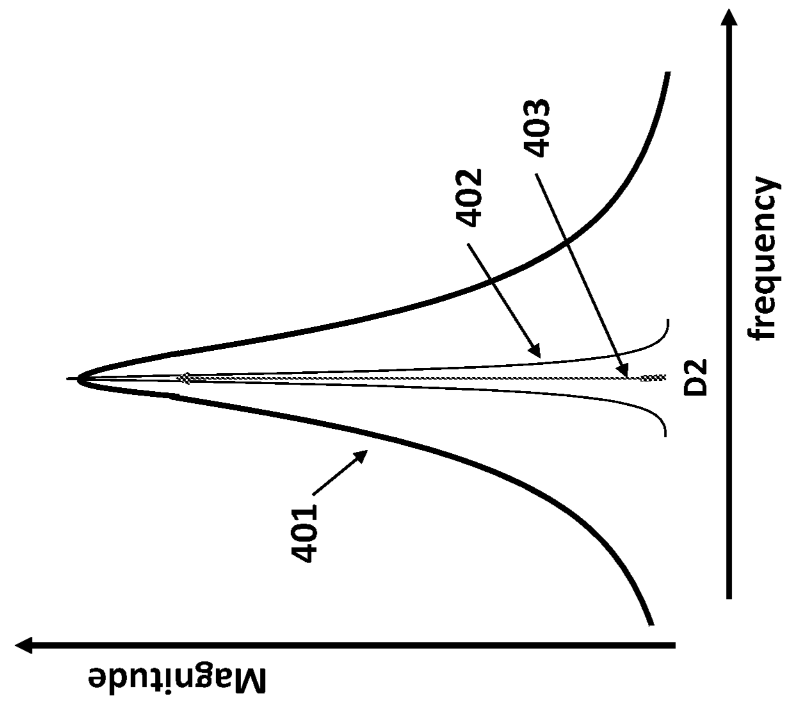
FIG. 4B illustrates the spectrum of a single etalon transmission peak, an atomic line, and a laser line, that are aligned.
Figure 4A:
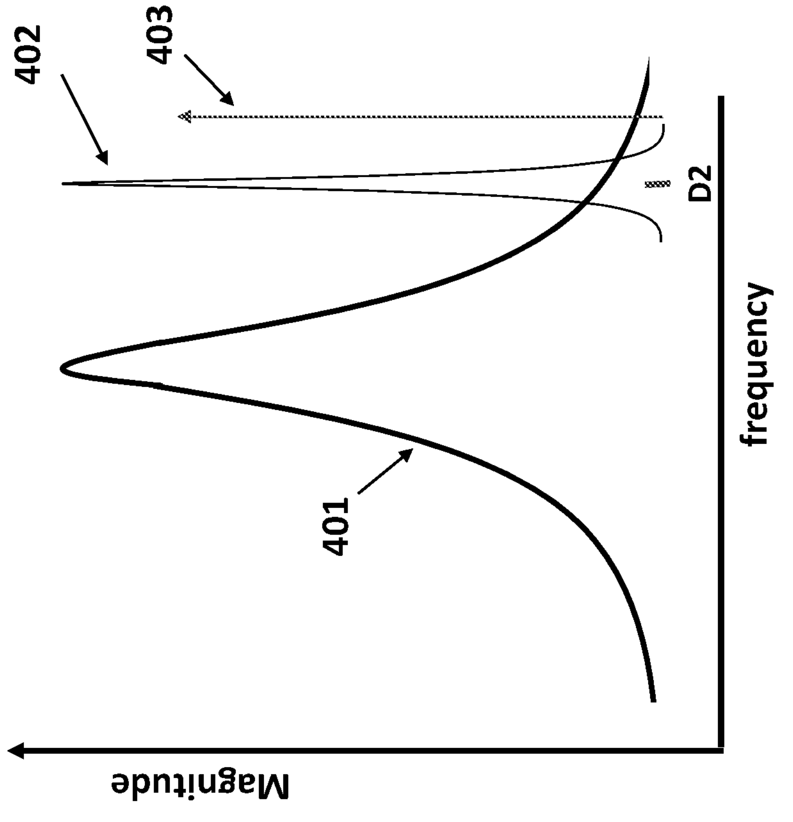
FIG. 4A illustrates the spectrum of a single etalon transmission peak, an atomic line, and a laser line, that are not aligned.

FIGS. 4A and 4B illustrate two example wavelength alignments between an atomic absorption line (or atomic line) 402 of atoms (atoms of the same type) inside an EVC, a laser line 403 and a transmission peak 401 of the EVC. The vertical axis (y-axis) indicates the magnitude (e.g., representing the intensity of the laser, magnitude of the EVC transmission, or magnitude of the optical absorption by the atoms). The horizontal axis (x-axis) represents wavelength, frequency, or energy. In some cases, the atoms may comprise rubidium (Rb) atoms and the absorption line 402 may be an absorption line of Rb atom having a peak absorption wavelength at 795 nm. In some cases, the optical intensity of the input laser beam may need to be larger than a threshold value to support a strong interaction between the atomic states of the atom (e.g., for example Rb atomic state associated with the absorption line centered at 705 nm), and the laser light. In the example shown, the FWHM of the EVC transmission peak 401 is larger than the atomic linewidth (the FWHM of the atomic line 402), and the atomic linewidth of the atomic line 402 is larger than the laser linewidth (the FWHM of the laser line 403), of the laser line 403.

FIG. 4A illustrates a scenario where the laser (e.g., peak) wavelength of the laser line 403, the peak wavelength of the transmission peak 401, and the peak wavelength of the atomic line 402 (e.g., atomic absorption line), are misaligned. In the example shown, an interaction between the input laser beam and the atomic states associated with the atomic line 402, and/or transmission of the input laser beam through the EVC may be weak. As such, the wavelength alignment illustrated in FIG. 4A, may not support strong interaction between the input laser beam and the atoms inside the EVC, and may not allow monitoring or utilizing such interaction using the transmitted optical power or intensity.

FIG. 4B illustrates a scenario where the laser line 403, the transmission peak 401 of the EVC, and the atomic line 402 of an atom contained inside the EVC, are aligned. In some cases, the atomic linewidth may be narrower than the FWHM of the EVC transmission peak (cavity linewidth). In some cases, the laser linewidth can be smaller than the atomic linewidth and the cavity linewidth.

In some examples, a wavelength difference between the peak transmission wavelength of the transmission peak 401 and the peak atomic wavelength of an atomic line 402 that is aligned with the transmission peak 401, may be smaller than 30%, 20%, 10%, 5%, 1%, 0.1% of the cavity linewidth (FWHM of the transmission peak) or any range formed by any of these values, or possibly smaller.

In some examples, a wavelength difference between the peak atomic wavelength of an atomic line 402 and the peak laser wavelength (herein referred to as laser wavelength) of the laser line 403 can be smaller than 100%, 50%, 30%, or 10% of the atomic linewidth or any range formed by any of these values. In some cases, the peak atomic wavelength of the atomic line 402 can be substantially equal to the laser wavelength. In some cases, a wavelength difference between the peak absorption wavelength (or peak atomic wavelength) and the laser wavelength can be larger than 100%, 125%, 200%, 300%, or 400% of the atomic linewidth but potentially less than 106 times the atomic linewidth or any range formed by any of these values.

In some cases, a wavelength difference between the peak transmission wavelength of the transmission peak 401 and the laser wavelength aligned with the peak transmission 401 can be smaller than 30%, 20%, 10%, 5%, 1%, 0.1% of the cavity linewidth or any range formed by any of these values or possibly smaller.

As one example, the FWHM of an EVC having a width between 2 and 10 mm can be designed with reflective mirrors to have an FSR on the order of 25 or 50 GHz, and a FWHM of about 6 GHz. In this example, the atomic linewidth of the atomic line of interest can be narrower than 1 GHz (e.g., smaller than 500 MHz) and the laser linewidth can be much narrower than the atomic line (e.g., less than 5 MHz). When the atomic line is as narrow or narrower than the cavity linewidth, the laser interaction with the atomic line can happen within a bandwidth for which etalon transmission (transmission peak) is large and the intensity of light within the etalon is significantly enhanced.

In some cases, the wavelength alignment scenario shown in FIG. 4B may result in a strong interaction between input laser beam and the atoms (e.g., the atomic states associated with the atomic absorption line 402). In some such cases, the wavelength alignment scenario shown in FIG. 4B, may result in circulation of high intensity laser light inside the EVC and strong interaction between the laser light and atoms (as described with respect to FIG. 3B). In some examples, the laser source that generates the laser line 403 can be a tunable laser and the peak wavelength of the EVC (transmission peak), may be tuned by controlling a temperature of the EVC. In some such examples, the laser wavelength and the peak wavelength may be tuned to align the peak wavelength, the laser line and the atomic line that are originally misaligned (e.g., changing the alignment scenario shown in FIG. 4A to the one shown in FIG. 4B).

In some cases, an input laser beam that becomes resonant inside the EVC (e.g., its wavelength is within the cavity linewidth), can be a pump beam used to excite atoms in the EVC (e.g., to populate an upper level of an atomic transition with electrons). In some other cases, an input laser beam that becomes resonant inside the EVC can be a probe beam (e.g., a laser beam used to optically monitor a state of the excited atoms inside the EVC).

In some cases, a desired wavelength spacing (spectral distance) between the peak wavelength (of an EVC transmission) and the wavelength of the input laser beam may be provided by selecting a longitudinal distance, along a direction substantially perpendicular to the first and second reflective surfaces, between the first and the second reflective surfaces of the EVC (e.g., an optical path length of the etalon for a single pass). In some cases, the peak wavelength may be tuned by changing the temperature of the EVC. In some cases, the angle of incidence of the input laser beam with respect to the EVC (e.g., with respect to the first reflective surface of EVC) may be tuned to adjust the wavelength spacing between the peak EVC wavelength and the wavelength of the input laser beam (laser wavelength). In various implementations, the wavelength spacing between the peak EVC wavelength and the wavelength of the input laser beam may be adjusted by a combination of temperature tuning, tuning the angle of incidence, and tuning the laser wavelength.

Example Optical Arrangements for Resonant Atomic Sensing

Figure 5:
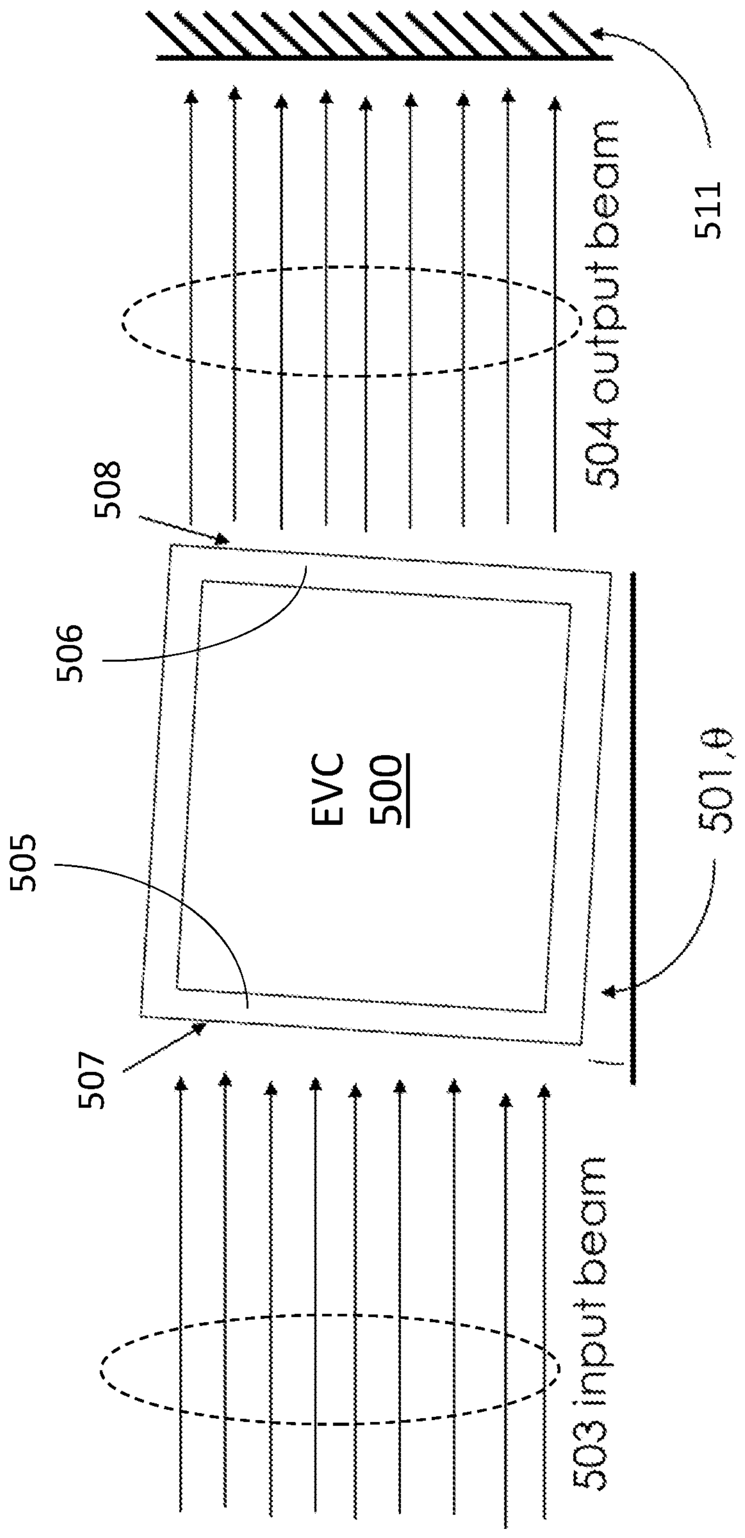
FIG. 5 illustrates an etalon vapor cell (EVC) in an optical arrangement that supports double pass transmission through the EVC.

FIG. 5 illustrates an EVC 500 used in a double pass optical arrangement, similar to the optical arrangement shown in FIG. 1B, configured to enable effective optical interaction between an input laser beam 503 and atoms inside the EVC. In some cases, the optical arrangement may be used in an atomic sensor. In some examples, the input laser beam 503 can be a probe beam configured to monitor a state of the atoms inside the EVC. In some other examples, the input laser beam 503 can be pump beam configured to excite the atoms inside the EVC. In yet other examples, the laser beam 503 may comprise a pump beam and a probe beam. In some cases, the optical spectrum of the output beam (transmitted beam) 504 and the optical spectrum of a reflection of the output beam 504 transmitted for a second time through the EVC 500 may comprise features described above with respect to the optical transmission spectrum 200.

The EVC 500 may comprise a first cell wall 505 and a second wall 506. In some cases, the first wall 505 and the second wall 506 may be substantially parallel to each other. The EVC 500 may have a length substantially equal to a distance between the first cell wall 505 and the second cell wall 506 along a longitudinal direction perpendicular to both cell walls. Additionally the EVC 500 may have a width along a lateral direction perpendicular to the longitudinal direction. In some cases, the first cell wall 505 may comprise a first reflective surface 507 and the second wall 506 may comprise a second reflective surface 508. In some examples, the first reflective surface 507 may comprise a first reflective coating on the first wall 505 and the second reflective surface 508 may comprise a second reflective coating on the second wall 506. In various implementations, a reflective coating may comprise a metallic or a dielectric coating. In some cases, the dielectric coating may comprise a multilayer coating.

In some examples, the first and/or the second reflective coatings may be disposed on the inner surfaces of the first 505 and/or the second 506 walls respectively. In some instances, the first and/or the second reflective coatings may be disposed on the outer surfaces of the first 505 and/or the second 506 walls respectively. In various implementations, a surface of the first 505 or the second 506 wall that is not coated with a reflective coating may comprise an antireflection (AR) coating to minimize small parasitic reflections. In some cases, a surface of the first cell wall 507 that is opposite to the reflective surface of the first cell wall may comprise an AR coating. In some cases, a surface of the second cell wall 508 that is opposite to the reflective surface of the second cell wall may comprise an AR coating.

In some examples, before becoming incident on the EVC 500, the input laser beam 503 may pass through a polarization beam splitter, and other optical components (not shown) configured to prepare the input laser beam in a first polarization state. In some cases, the optical components may comprise a wave plate configured to rotate the polarization of input laser beam such that a polarizing beam splitter can be used to separate the reflected light after a second pass through the EVC 500 (e.g., similar to the configuration shown in FIG. 1B).

In some implementations, the input laser beam 503 may become incident on the EVC 500 (e.g., on the a first cell wall 505 or reflective surface 507 of the EVC 500) with and angle of incidence θ 501 (e.g., with respect to a direction perpendicular to the surface of the first cell wall 505). In some such cases, the EVC 500 may be tilted with respect to the direction of propagation of the input laser beam 503.

The transmitted laser beam 504 transmitted through the EVC 500, may be reflected by a reflector 511 (e.g., a retroreflector) that reflects the transmitted laser beam 504 back toward the cell wall 508 through which the transmitted laser beam 504 exits the EVC 500. In some cases, the reflector 511 may be substantially perpendicular to the direction of propagation of the output laser beam 504 such that an angle of incidence of the resulting reflected beam with respect to the cell wall 508 is substantially equal to an angle between the transmitted laser beam 504 an a direction perpendicular to the cell wall 508. After being reflected by the reflector 511, the reflected laser beam may pass through the EVC 500 for the second time. In some cases, the vapor in the EVC 500 may absorb a portion of the reflected laser beam or may rotate the polarization of the reflected laser beam.

In some cases, the EVC 500 may be used in a single pass optical arrangement similar to the optical arrangement shown in FIG. 1A. In some such cases, the reflector 511 may be replaced by the photodetector 111 and the output laser beam 504 may be detected after a single pass through the EVC 500.

In some implementations, the optical arrangement shown in FIG. 5, may comprise other optical components, such as lenses, prisms, dichroic reflectors, polarizers, waveplates, or other components for particular applications. In some cases, these components may be used, e.g., to align, the input laser beam 503 with respect to the EVC 500 (e.g., to adjust an angle of incidence or an overlap between the input laser beam 503 and the cell wall 507), control the polarization and/or divergence of the input 503 and/or output 504 laser beams, or other parameters associated with the configuration shown in FIG. 5. In various implementations, the alignment between the laser wavelength, absorption line of the atom and the transmission peak of the EVC may be similar to the alignment described with respect to FIG. 4B.

As described above, the tuning of the peak wavelength of the EVC (also referred to as peak wavelength) with respect to the atomic line (e.g., atomic absorption line), can be accomplished, at least partially, by carefully designing and fabricating the EVC 500 such a that a longitudinal distance, along a direction substantially perpendicular to the first reflective surface 507, between the first 507 and the second 508 reflective surfaces (optical path length, e.g., a single pass optical path length, of the EVC) supports at least one peak wavelength close to the corresponding atomic absorption line. In some implementations, a longitudinal distance between the first 507 and the second 508 reflective surfaces (optical path length, e.g., a single pass optical path length, of the EVC) may be configured (e.g., during design and fabrication step), such that an initial spectral distance between at least one EVC peak wavelength and a peak atomic wavelength is less than the 100%, 200%, 300%, 500% of the free-spectral-range (FSR) of the cavity or any range formed by any of these values. In some implementations, a roundtrip length of the cavity may be configured (e.g., during design and fabrication step), such that an initial spectral distance between at least one EVC peak wavelength and a peak atomic wavelength is less than the 100%, 200%, 300%, 500% of the free-spectral-range (FSR) of the cavity or any range formed by any of these values.

In some cases, a spectral distance between the peak wavelength and the atomic wavelength can be actively tuned by tuning the optical path length (or the roundtrip length) of the EVC using temperature control, or by rotating the EVC 500 relative to the direction or propagation of the input laser beam. A combination of careful selection of design parameters and (e.g., optical path length of the EVC), and post fabrication tuning using temperature or angel of incidence may be provide a desired spectral distance between peak wavelength of an EVC transmission peak and a peak atomic wavelength.

In some implementations, the input surface or cell wall of EVC on which the input laser beam is incident may be substantially perpendicular to the direction of propagation of the input laser beam 503. In some examples, the angle θ 501 between the direction of propagation of the laser input beam 503 and the first reflective surface 507 can be from 0 to 1 degrees, 1 to 3 degrees, 3 to 5 degrees, 5 to 10 degrees, 10 to 20 degrees or any range formed by these ranges or any range formed by any of these values or possibly smaller or larger. In some implementations, the first 507 and/or the second 508 reflective surfaces may be configured so that when the angle θ 501 is relatively small (e.g., smaller than 2 degrees, 5 degrees, or 10 degrees), the phase and/or the magnitude of the reflection coefficients for the TM and TE electric field components of the input laser beam 503 are substantially equal. For example, a multilayer dielectric coating of the first 507 and/or the second 508 reflective surface may be tailored such that the phase and/or the magnitude of the reflection coefficients for the TM and TE electric field components of the input laser beam 503 are substantially equal for small values of the angle θ 501.

In some implementations, a second photodetector (e.g., a photodiode) may be placed on the input side of the EVC 500 (where the input beam 503 resides) to capture at least a portion of light reflected from the first reflective surface 507, to monitor the optical alignment between the input beam 503 and the EVC 500 and the interaction of the atoms in the EVC 500 and the laser light coupled to the EVC 500. In some such implementations, the EVC 500 (e.g., the first reflective surface 507 of the EVC 500) may be angled relative to the direction of propagation of the input laser beam 503 such that light reflected from the first reflective surface 507 can be captured by the second photodetector. In some cases, the spectrum reflected light from the first reflective surface 507 may comprise reflection dips corresponding to the transmission peaks of the EVC 500. In some such cases, the spectrum of the reflected light detected by the second detector may be used to measure the spectral location of the peak wavelength of the EVC and adjust the alignment between the laser wavelength and the peak wavelength of the EVC.

In some cases, a waist or a diameter of the input laser beam 503 may be larger than a width of the EVC 500 in a direction perpendicular to the direction of propagation of the input laser beam 503. In some cases, a cross-sectional area of the input laser beam 503 perpendicular to the direction of propagation of the input laser beam 503, near or at the reflective surface 507 may be larger than 50%, 70%, or 90% of a cross-sectional area of the EVC 500 in a plane perpendicular the direction of propagation of the input laser beam 503 or an area of the first reflective surface 507 or any range formed by any of these values. In some cases, a beam waist or a diameter of the input laser beam 503 may be smaller than the width of the EVC 500 in a direction perpendicular to the direction of propagation of the input laser beam 503. In some such cases, the waist of the input laser beam can be smaller than 2 millimeter, 1 millimeter, 500 microns, 400 microns, 300 microns, 200 microns, 100 microns or 50 microns, or smaller values (but potentially larger than 1 nanometer) or any range formed by any of these values.

In various implementations, a beam waist of a laser beam (e.g., an input laser beam), can be two times a minimum value of a laser beam radius where the laser beam radius is a radius at which the intensity of the laser beam is decreased to $1/e^2$ (where e is Euler's number), or 0.135 of its peak value (or axial value associated with an axis of symmetry of the laser beam along its direction of propagation).

In some examples, the chamber of the EVC 500 may contain one or more isotopes of Rb, Cs, or other atoms. In some such examples, the input laser light beam 503 may have a wavelength close or substantially equal to the D1 or the D2 absorption line of Rb or of Cs. In some cases, the EVC 500 may contain Nitrogen and/or Xenon in addition to Rb or Cs.

In some cases, the optical arrangement show in FIG. 5, may be used in a Nuclear Magnetic Resonance (NMR) gyroscope configuration, whereby the system is surrounded by a controlled magnetic field or fields, and the light is used to pump and probe the atoms, with a photodetector or photodetectors receiving the light signal on the other side of the cell.

In some implementations, the input laser beam may comprise a linearly polarized probe laser beam. In some such implementations, a second input laser beam (a pump beam) having a circularly or elliptical polarization state may be coupled to the EVC 500 (e.g., via the first reflective surface), to excite the atoms inside the chamber of the EVC. In some cases, the pump and/or probe laser beams can be single wavelength laser beams having a circular or elliptical polarizations.

In some cases, multiple vapor cells (e.g., EVCs) may be used in an optical system or an optical arrangement, where one vapor cell is used as a line locking reference and other vapor cells are used for probing atoms under environmental influence.

In some examples, the EVC 500 may be enclosed in an oven or temperature controlled chamber to enable controlling the temperature of the EVC.

In some examples, the EVC 500 may have a square or rectangular shape cross-section in a plane parallel or perpendicular to the direction of propagation of the input laser beam 503. In some other cases, the cross-section of the EVC chamber in a plane parallel or perpendicular to the direction of propagation of the input laser beam 503 may comprise other shapes (e.g., a polygonal shape). In various implementations, the EVC chamber may comprise at least two parallel cell walls facing each other. The parallel walls of the EVC chamber may be coated with a reflective coating to form an Etalon cavity. In some examples, the EVC chamber may comprise a polygonal prism where two parallel side surfaces of the prism each comprise one of the two reflective surfaces of an EVC. In some such cases, the polygonal prism may comprise multiple EVCs each formed by a pair of reflective side surfaces of the polygonal prism.

In some cases, the reflectance of the second reflective surface 508 of the EVC 500 can be close to 100% (e.g., larger than 99%, 99.99%, or 99.999% but potentially less than 100% or any range formed by any of these values) whilst that of the first reflective surface 507 is lower. In some such cases, after entering the EVC chamber, the input laser beam 503 can be reflected by the second reflective surface and exit the EVC through the first reflective surface. In such configurations, the spectrum of the output beam may comprised one or more series of equally spaced reflection dips where each reflection dip is centered at a minimum wavelength and may have a linewidth that is also referred to as cavity linewidth. In some cases, where the reflectance of the second reflective surface 508 of the EVC 500 is close to 100% and wavelength of laser input beam is within a reflection dip (e.g., within the cavity linewidth) of the EVC, the laser input beam may become resonant inside the EVC and its intensity may be enhanced.

Etalon Vapor Cells Supporting Interaction with Multiple Beams

In some implementations, an EVC may support interaction between two or more laser beams with the atoms contained inside the EVC. In some such cases, individual input laser beams may propagate along different directions and enter the EVC via different cell walls or via different portions of a cell wall of the EVC. In some cases, two input laser beams incident on the EVC may propagate along two orthogonal directions. In some cases, (e.g., when the EVC comprises a polygonal prism), an EVC may comprise a plurality of cell walls where at least a pair of cell walls comprise reflective surfaces that form an etalon for light having a wavelength within the operational wavelength of the EVC. In some such examples, at least one input laser beam may have a wavelength within a transmission peak of the corresponding etalon and become resonant inside the EVC. In some cases, two or more pairs of reflective surfaces may form two or more etalons. In some such cases, the peak wavelength, the FSR, and/or the linewidth of at least two etalons formed by the reflective surfaces of the EVC may be different. In some cases, the at least one input laser beam may have a wavelength within a transmission peak of a first etalon and at least one input laser beam may have a wavelength within a transmission peak of a second etalon, where the first and the second etalon are formed between two different pairs of reflective surfaces of the EVC. In some examples, a pair of parallel cell walls that do not comprise reflective surfaces may allow transmission of a laser beam via the EVC without becoming resonant inside the EVC.

In some cases, at least one of the cell walls of an EVC may comprise a reflective surface having a spectral reflectance with high and low reflectivity spectral regions. In some cases, the high and low reflectivity spectral regions can be non-overlapping spectral regions. For example, the spectral reflectance of a reflective surface can be higher below a first cutoff wavelength, above a second cutoff wavelength, or between the first and second cutoff wavelengths, comparted to other spectral regions. In some cases, the first cutoff wavelength can be smaller than the second cutoff wavelength. In some examples, a spectral distance between the first and the second cutoff wavelengths can be smaller than 20 nm, less than 15 nm, less than 10 nm, less than 5 nm, or less than 1 nm or any range formed by any of these values. In various implementations, the reflectance of a reflective optical surface can be larger than 50%, 60%, 70%, 80%, 90%, 99%, or larger (but potentially less than 100%) within a high reflectivity spectral region or any range formed by any of these values, and smaller than 20%, 10%, 5%, 1% or lower (but potentially larger than 0), within a low reflectivity spectral region or any range formed by any of these values. In some cases, the low or the high reflectivity spectral region may include all wavelengths smaller than a first cutoff wavelength but larger than a lower bound wavelength. In some examples, a spectral distance between the lower bound wavelength and the cutoff wavelength can be larger than 5×FSR, 10×FSR, 20×FSR, 50×FSR, 100×FSR, 200×FSR, 300×FSR, 1000×FSR, or larger, but potentially smaller than 1 meter or any range formed by any of these values, where FSR is the free spectral range of the EVC or an etalon of the EVC that the corresponding reflective surface. In some cases, the low or the high reflectivity spectral region may include all wavelengths larger than a second cutoff wavelength (or a cutoff wavelength) but smaller than an upper bound wavelength. In some examples, a spectral distance between the upper bound wavelength and the second cutoff wavelength can be larger than 5×FSR, 10×FSR, 20×FSR, 50×FSR, 100×FSR, 200×FSR, 300×FSR, 1000×FSR, or larger, but potentially smaller than 1 meter or any range formed by any of these values.

In some examples, a pair of cell walls (e.g., a pair of cell walls that face each other and can be parallel) may not include a reflective coating. In some such cases, an input laser beam incident on of these cell walls may pass through the EVC without becoming resonant inside the EVC.

In some implementations, an EVC may be configured to allow effective interaction of two laser beams with two distinct atomic lines (e.g., two absorption lines). In some cases, the two distinct atomic lines can be the atomic lines of the same type of atoms or two different types of atoms. In some cases, the EVC may comprise two pairs of reflective surfaces where each pair forms an Etalon cavity for enhancing the interaction of a laser beam with a different atomic line. In some such cases, the two laser beams may propagate along two orthogonal directions and become incident on two perpendicular reflective surfaced of the EVC where each reflective surface is a reflective surface of a different etalon formed by the EVC cell walls.

In some implementations, an EVC may comprise a first and a second etalon where at least one transmission peak of the first etalon at least partially overlaps with a first atomic line (e.g., D1 line of Rb at 795 nm), and at least one transmission peak of the second etalon at least partially overlaps with a second atomic (e.g., D2 line of Rb at 780 nm). In some such implementations, an optical axis of the first etalon can be orthogonal to the optical axis of the second etalon. In some cases, a wavelength and/or an angle of incidence (with respect to a reflective surface of the EVC) of a first laser beam, and/or a second laser beam may be tuned such that the wavelength of the first laser line at least partially overlaps with the first atomic line and a first transmission peak of the first etalon and the wavelength of the second laser line at least partially overlaps with the second atomic line and the a second transmission peak of the second etalon. Additionally, the temperature of the EVC may be adjusted to further align the first and the second transmission peaks with the first and the second atomic lines respectively.

In some cases, multiple laser beams may enter the EVC and interact with the atoms contained in the EVC, but only one laser beam becomes resonant inside the EVC. In some such cases, the EVC may comprise at least one etalon formed by a pair of reflective surfaces. In some other cases, the EVC may comprise multiple etalons. In some cases, a transmission peak of one of the etalons may overlap with a laser line associated with a laser beam incident on the EVC.

In some examples, a first input laser beam may have a wavelength within a transmission peak of an etalon (e.g., within the FWHM of the transmission peak) of the EVC and become resonant inside the etalon while a second input laser beam that is incident on a cell wall that is not associated with an etalon, may pass through the EVC without becoming resonant. In some such examples, the first input laser beam can be pump beam and the second input laser beam can be a probe beam. In some cases, the wavelength of the first input laser beam can be within a first atomic line (e.g., within the linewidth of the first atomic line), and the wavelength of the second input laser beam can be within a second atomic line (e.g., within the linewidth of the second atomic line). In some such examples, the first and the second atomic lines can be the same or different atomic lines. In some examples, the first and the second atomic lines may comprise atomic lines of the same type of atom. In some examples, the first and the second atomic lines may comprise atomic lines of two different types of atoms. In some cases, at least one of the first and the second input laser beams (e.g., the pump beam or the resonant beam) may have a beam waist larger than 50%, 70%, or 90% of a width of the EVC along a direction perpendicular to the direction of propagation of the corresponding input laser beam or any range formed by any of these values. In some cases, at least one of the first and the second input laser beams (e.g., the probe beam or the non-resonant beam) may have a beam waist smaller than 2 millimeter, 1 millimeter, 500 microns, 400 microns, 300 microns, 200 microns, 100 microns, 50 microns, or any range formed by any of these values or possibly smaller. In some cases, the waist diameter of an input laser beam (e.g., the pump beam) that becomes resonant inside the EVC may be larger than that of another input laser beam (e.g., a probe laser beam) that does not become resonant inside the EVC.

In some cases, a first and a second laser beam having a first laser wavelength and a second laser wavelength respectively (e.g., different from the first laser wavelength), may become incident on the same cell wall or different cell walls of an EVC and enter the chamber of the EVC. In some such cases, the atoms inside the chamber may comprise a first and a second atomic lines. In some examples, the first and the second laser wavelengths can be within the first atomic line and/or within the first transmission peak of a first etalon of the EVC. In some examples, the first laser wavelength can be within the first atomic line and the second laser wavelength can be within a second atomic line. In some such cases, the first atomic line may at least partially overlap with the first transmission peak and the second atomic line may at least partially overlap with a second transmission peak of the first or a second etalon of the EVC. In some cases, the first laser wavelength may be within the first transmission peak and the second laser wavelength may be within the second transmission peak of the first or the second etalon of the EVC. In various examples, the first and the second atomic lines can be the atomic lines of the same or different types of atoms contained in the EVC.

Figure 6:
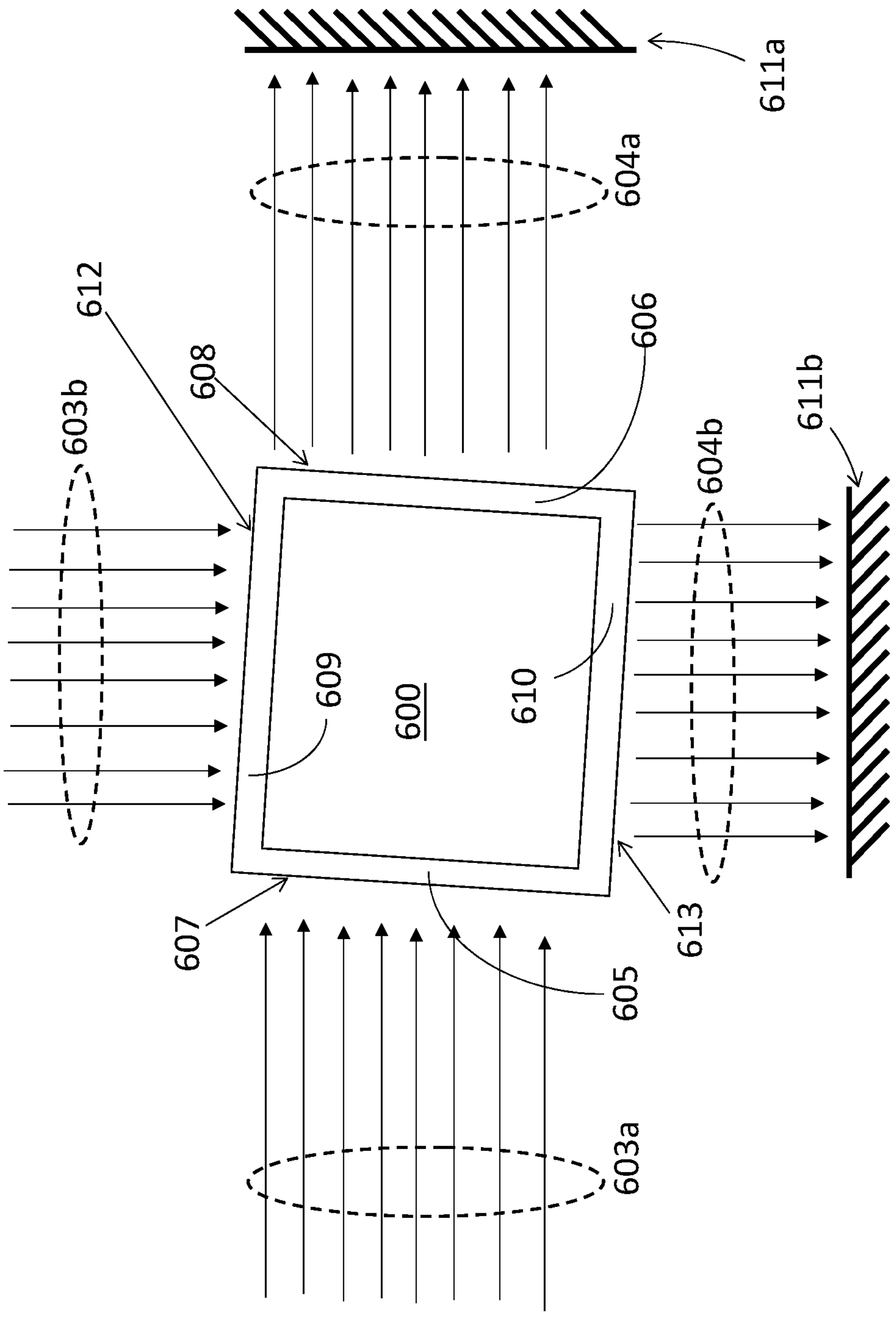
FIG. 6 illustrates an EVC in an optical arrangement that supports double pass transmission through the EVC along two orthogonal directions.

FIG. 6 illustrates an example EVC 600 configured to enable effective interaction of a first input laser beam **603*a* and a second laser beam 603*b* with atoms contained inside the chamber of the EVC 600. In some cases, where the atoms of the same type or different types have two atomic absorption lines (e.g., two distinct absorption lines), the first 603*a* and the second 603*b* laser input beams may interact with a first and a second atomic lines respectively. In some examples, the two atomic lines may comprise distinct absorption lines of Rb where the first absorption line is centered at 780 nm and the second absorption line may be centered at 795 nm. In the example shown, at least one transmission peak of a first etalon formed between a first reflective surface 607 of a first cell wall 605 and a second reflective surface 608 of a second cell wall 606 of the EVC 600 may at least partially overlap with the 780 nm atomic line of Rb. Further, at least one transmission peak of a second etalon formed between a third reflective surface 612 of a third cell wall 609 and a fourth reflective surface 613 a fourth cell wall 610 of the EVC 600** may overlap with the 795 nm atomic line of Rb. In various implementations, a reflective surface can be an internal surface (e.g., a surface in contact with the gas sample) or an external surface of a cell wall.

In some examples, at least one of the input laser beams **603*a* or 603*b* may pass through the EVC 600** without becoming resonant. In some such cases, the surfaces of the cell walls through which the non-resonant input laser beam passes may have low reflectance (e.g., a reflectance less than 20%, 10%, 5%, 1% or any range formed by any of these values or possibly lower), at least within one low reflectivity spectral region where the wavelength of the corresponding input laser beam resides. In some cases, the surfaces of the cell walls through which the non-resonant input laser beam passes may comprise an AR coating.

With continued reference to FIG. 6, the two input laser beams 603*a*/603*b* may interact with the atoms (e.g., in vapor form) inside an EVC 600. In some cases, the two laser beams 603*a*/603*b* may pass through the EVC 600 along two orthogonal directions. The first input laser beam 603*a* may propagate along a first direction and the second laser beam may propagate along a second direction. In some cases, the first and the second directions may be substantially perpendicular to each other. In some cases, the laser beams 603*a*/603*b* may have substantially identical or different wavelengths. The EVC 600 may comprise a first etalon formed between the first reflective surface 607 and the second reflective surface 608 of the EVC 600. In some cases, the EVC 600 may comprise a second etalon formed between the third reflective surface 612 and the fourth reflective surface 613. In the example shown, a first reflector 611*a* may reflect a first the transmitted laser beam 604*a* and a second reflector 611*b* may reflect a second transmitted laser beam 604*b* back two the EVC 600. In some cases, the first input laser beam 603*a* may pass through a first beam splitter placed before the first reflective surface 605 and the second input laser beam 603*b* may pass through a second beam splitter placed before the third reflective surface 612. In some such cases, the first beam splitter may redirect the reflection of the first transmitted laser beam 604*a* received from the first reflective surface 607 toward a first photodetector and the second beam splitter may redirect the reflection of the second transmitted laser beam 604*b* received from the second reflective surface 613 toward a second photodetector.

In various configurations, one or both reflectors 611*a*/611*b* may be replaced by one or more photodetectors. In such configurations, these photodetectors may receive the first 604*a* and/or second 604*b* transmitted laser beams to measure the spectral transmission of the first and the second etalons.

In some examples, a diameter of the input laser beam 603*a* and/or the input laser beam 603*b* may be smaller than a width of the EVC 600 along a direction perpendicular to the propagation direction of these laser beams. In some examples, a diameter of the input laser beam 603*a* and/or the input laser beam 603*b* may be substantially equal to or larger than a width of a cell wall (e.g., an entrance cell wall) of the EVC 600 (along a direction perpendicular to the propagation direction of these laser beams), such that the input laser beam 603*a*/603*b* illuminate the entire respective surface of the cell. In some implementations, a third laser beam propagating along a third direction different than that of the first and the second laser beams 603*a*/603*b* may pass through the EVC 600. In some examples, the first, second, and the third laser beams may have different wavelengths. In some cases, the wavelength of at least one of the input laser beams may be within a transmission peak of an etalon formed by two reflective surfaces of the EVC 600. In some cases, the wavelength of at least one of the input laser beams may be within an atomic linewidth of one type of atom contained in the chamber of EVC 600. In some implementations, the first surface 607 and the second surface 608 may be substantially parallel and comprise HR coatings. In some implementations, the third 612 and the fourth surfaces 613 may be substantially parallel and comprise HR coating. In some implementations, a surface of any of cell walls 605, 606, 609, and 610 may comprise antireflection (AR) coatings.

In some cases, an EVC may comprise more than two etalons. In some such cases, at least two etalons of an EVC may not have orthogonal optical axes. In some examples, a cross-section of an EVC in a plane formed by the direction of propagation of two or more laser beams may comprise a hexagonal cross section (having 3 optical axes) or an octagonal cross-section (having 4 optical axes). An EVC with a hexagonal cross-section may comprise three etalons formed by three pairs of reflective surfaces (perpendicular to the 3 optical axis). An EVC with octagonal cross-section may comprise four etalons formed by four pairs of reflective surfaces (perpendicular to the 4 optical axis). In some cases, an EVC may have other cross-sectional shapes supporting formation of more than 4 etalons. In some cases, the etalons formed by different pairs of the reflective surfaces may have equal or different FSRs and/or transmission peaks having different peak wavelengths. As such, the laser beams incident on the EVC along different optical axes of the EVC, corresponding to different etalons, may have similar or different wavelengths in order to overlap with a respective transmission peak and become resonant inside the EVC.

In various examples, an input laser beam may illuminate the entire or a portion of the surface of a cell wall of the EVC.

The EVC 600 and the configuration shown in FIG. 6 may include one or more features of the EVC 500 and/or the configuration described with respect to FIG. 5, the details of which may not be repeated herein for brevity.

In the example shown in FIG. 6, to provide resonant enhanced interaction between both input laser beams 603*a*/603*b* and the atoms inside EVC 600, the incident angle of the input laser beams 603*a*/603*b* relative to the etalon surfaces 607/612 may be tuned such that a transmission peak of the first/second etalon formed between the first/third surface 607/612 and second/fourth surface 608/613 at least partially overlaps with the wavelength of the first/second input laser beams 603*a*/603*b*. In other cases, one of the two input laser beams (e.g., orthogonal beams) may be pass through the EVC 600 without resonance, and the other becomes resonant inside the EVC. In some such cases, only one pair of surfaces 607/608 or 612/613 may comprise HR coating. In various implementations, the input laser beams 603*a*/603*b* may have different polarization states.

In some examples, a cross-sectional area of at least one of the laser beams 603*a*/603*b* can be smaller than a cross-sectional area of the EVC 600 perpendicular to the direction of the respective input laser beam. In some, such cases, the cross-sectional area of the other beam can be larger than the cross-sectional area of EVC 600 perpendicular to the direction of propagation of the respective input laser beam. In some cases, a waist or a diameter of at least one of the laser beams 603*a*/603*b* can be smaller than a width of the EVC 600 in a direction perpendicular to the direction of propagation of the corresponding input laser beam by a factor of 2, 4, 6, 8, 10, 100, or a larger factor (but potentially smaller than 1020) or any range formed by any of these values. In some cases, a beam waist of at least one of the input laser beams 603*a*/603*b* can be smaller than 2 millimeters, 1 millimeters, 500 microns, 300 microns, 100 microns, 50 microns, or any range formed by any of these values or possibly smaller values.

As mentioned above, in some cases, one of the input laser beams 603*a*/603*b* may pass through the EVC 600 without resonance and the other may become resonant inside the EVC 600. In some such cases, a cross-sectional area of the laser beam that becomes resonant inside the EVC can be larger than 50%, 70%, or 90% (but potentially less than 1000%) of a cross-sectional area of the EVC 600 in a direction perpendicular to the direction of propagation of the corresponding input laser beam or any range formed by any of these values. In some such cases, the a cross-sectional area of the other input laser beam that passes through without becoming resonant inside the EVC, can be smaller than 2 millimeters, 1 millimeters, 500 microns, 300 microns, 100 microns, 50 microns, or smaller values or any range formed by any of these values.

In some cases, the third 612 and/or the fourth 613 reflective surfaces may have a spectral reflectivity comprising a first spectral region and second spectral region such that their reflectivity for light having a wavelength within the first spectral region is lower than their reflectivity for light having a wavelength within the second spectral region. In some such cases, the wavelength of the light is within an operational range of the EVC 600 (e.g., a wavelength range within which the EVC 600 is designed to operate). In some examples, reflectivity of the first spectral region may not exceed 50% of the reflectivity of the second spectral region for wavelengths within the operating wavelength range of the optical system.

In some such cases, a third input laser beam having a wavelength within the first spectral region may be incident on the third reflective surface 612 and the wavelength of the second input laser beam 612 may be within the second spectral region. A cross-sectional area of the second input laser beam can be larger than 50%, 70%, 90% (but potentially less than 1000%) of an area of the third reflective surface 612 or any range formed by any of these values and a beam waist of the third input laser beam can be smaller than 2 millimeters, 1 millimeters, 500 microns, 200 microns, 100 microns, 50 microns, 50 microns, or smaller values or any range formed by any of these values.

EVC Supporting Enhanced Interaction with Two Co-Propagating or Counter Propagating Laser Beams In some embodiments, the EVC may be designed to enable enhanced interaction of two laser beams propagating in parallel directions and having wavelengths close two different transmission peaks of the EVC with two different atomic lines. For example, in the configurations shown in FIG. 5 or FIG. 6, the input laser beams 503, 603*a*, and/or 603*b* may comprise two co-propagating input laser beams having different wavelengths close to two different transmission peaks of the EVC 500 or EVC 600.

In some cases, the two different atomic lines may comprise atomic lines of the same type of atoms. In some other, cases the two different atomic lines may comprise atomic lines of two different types of atoms. For example, in some embodiments where the atoms inside the EVC are Rb atoms, two laser beams having wavelengths near or at $\lambda_{D1}$=795 nm and $\lambda_{D2}$=780 nm lines (D1 and D2 lines of Rb) may co-propagate or counter propagate within the etalon.

In such cases, the optical path length (e.g., single pass optical path length) of at least one etalon of the EVC may be configured to satisfy the condition $(m^*FSR)=\lambda_{D1}-\lambda_{D2}$, indicating that an integer number (m) multiplied by the free spectral range (FSR) of the etalon is equal to the wavelength spacing between the two atomic lines of interest (D1 and D2). When this condition is satisfied, $\lambda_{D1}$ and $\lambda_{D2}$ will be substantially equal to two peak wavelengths of the etalon. As such, the etalon may simultaneously support enhanced interaction between two input laser beams having wavelengths at or near $\lambda_{D1}$ and $\lambda_{D2}$ that are incident on the reflective surface of the etalon. In the limit of close atomic lines, this condition may be approximated to $[m\times(\lambda^2/2\ nL)]=\lambda_{D1}-\lambda_{D2}$. In some implementations, one or both of the transmission peaks can be detuned from the peak atomic wavelength (e.g., peak absorption wavelength, peak polarization rotation wavelength, or peak EIT wavelength) by more than 20%, 30%, 50%, 100% or 500% of the atomic linewidth (but potentially less than the FSR) or any range formed by any of these values. In some implementations, the wavelength of an input laser beam that interacts with one of the atomic lines can be detuned from the peak atomic wavelength by more than 20%, 30%, 50%, 100% or 500% of the atomic linewidth (but less 100 microns) or any range formed by any of these values.

Figure 7A:
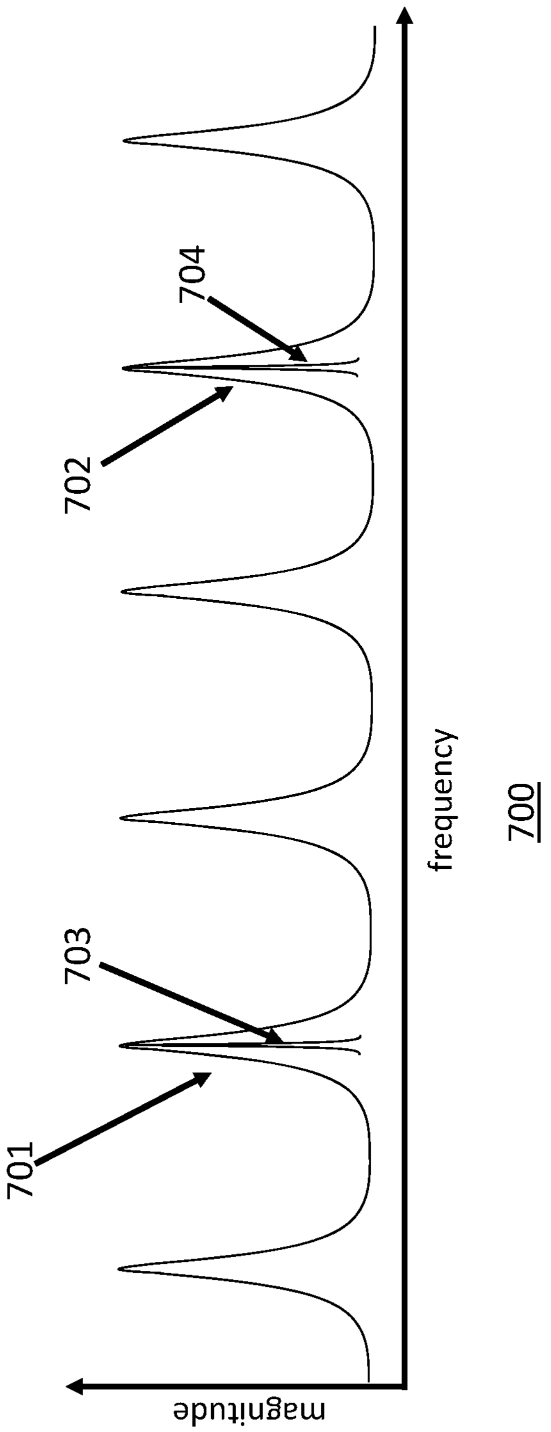
FIG. 7A illustrates an example transmission spectrum of an EVC where two transmission peaks of the EVC are aligned with two atomic lines.

FIG. 7A illustrates the transmission spectrum of an etalon of an example EVC (e.g., the etalon of EVC 500, or one of the etalons of the EVC 600) where two different transmission peaks of the etalon are aligned (e.g., at least partially overlap) with two different atomic lines. For example, a first transmission peak 701 may be aligned (at least partially overlap) with a first atomic line 703 and a second transmission peak 702 may be aligned with a second atomic line 704. In some cases, a first beam of light (e.g., a first input laser beam) having a first wavelength and a second beam of light (e.g., a second input laser beam) having a second wavelength may become incident (or may be coupled) to the EVC. In some such cases, the first wavelength may be aligned with the first atomic line 703 and the second wavelength may be aligned with the second atomic line 704. In some cases, for example in two photon Rydberg systems, the first wavelength can be 480 nm and the second wavelength can be 776 nm. In some cases, the first and the second beams of light may propagate I parallel directions (e.g., co-propagate). In various implementations, when a transmission peak is aligned or at least partially overlaps with as atomic line, a spectral distance between peak atomic wavelength and the peak transmission wavelength, can be less than 200%, 100%, 50%, 10%, 5%, 1% of the cavity linewidth or smaller values.

In the example shown, the two transmission peaks 701/702 are separated by three FSRs, however in various examples, the two transmission peaks (that are aligned with two different atomic lines) may be separated by more or less than three FSRs. In some cases, the two transmission peaks 701/702 may be separated by more than 10 nm, 100 nm, or more than 500 nm apart.

In some cases, the laser wavelengths may be slightly detuned (e.g., by less than 50%, 20%, 10%, 5%, or 1% of the atomic linewidth or smaller) or any range formed by any of these values, from atomic lines, or interacting with higher Rydberg electron states.

In some examples of Rydberg systems, a first input laser beam that pumps the atoms inside an EVC may have a larger diameter than a second input laser beam that probes the atoms (e.g., a property of the atoms). In these examples, the first laser line of the first input laser beam may overlap with a transmission peak of the etalon, while the second laser line of the second input laser beam may have a wavelength for which the reflection of one or both cell walls is small enough to allow transmission of the second laser input beam without enhancing its interaction with the atoms within the EVC. As such the first input laser beam (pump beam) may become resonant inside the etalon while the second input laser beam (probe beam), may pass through the EVC without becoming resonant.

In some implementations, the two or more transmission peaks of an EVC may be aligned with two or more atomic lines of various atoms such as Cesium, Strontium, and other gases useful for atomic sensing. In some implementations, the two or more transmission peaks of an EVC may be aligned with two or more atomic lines where individual transmission peaks are aligned with atomic lines of different types of atoms.

In some cases, three or more transmission peaks of the an etalon of an EVC may be aligned with three or more atomic lines of one or more types of atoms. In some cases, the dispersion of the cell walls (e.g., cell walls 505, 506, 605, 606, 609, or 610) can be tailored to facilitate alignment between multiple transmission peaks and multiple atomic lines. For example, a material used to fabricate a cell wall may be selected such that the FSR and/or the variation of the FSR of an etalon partially formed by a reflective surface of the cell wall allow simultaneous alignment between multiple transmission peaks of the etalon with multiple atomic lines.

Figure 7B:
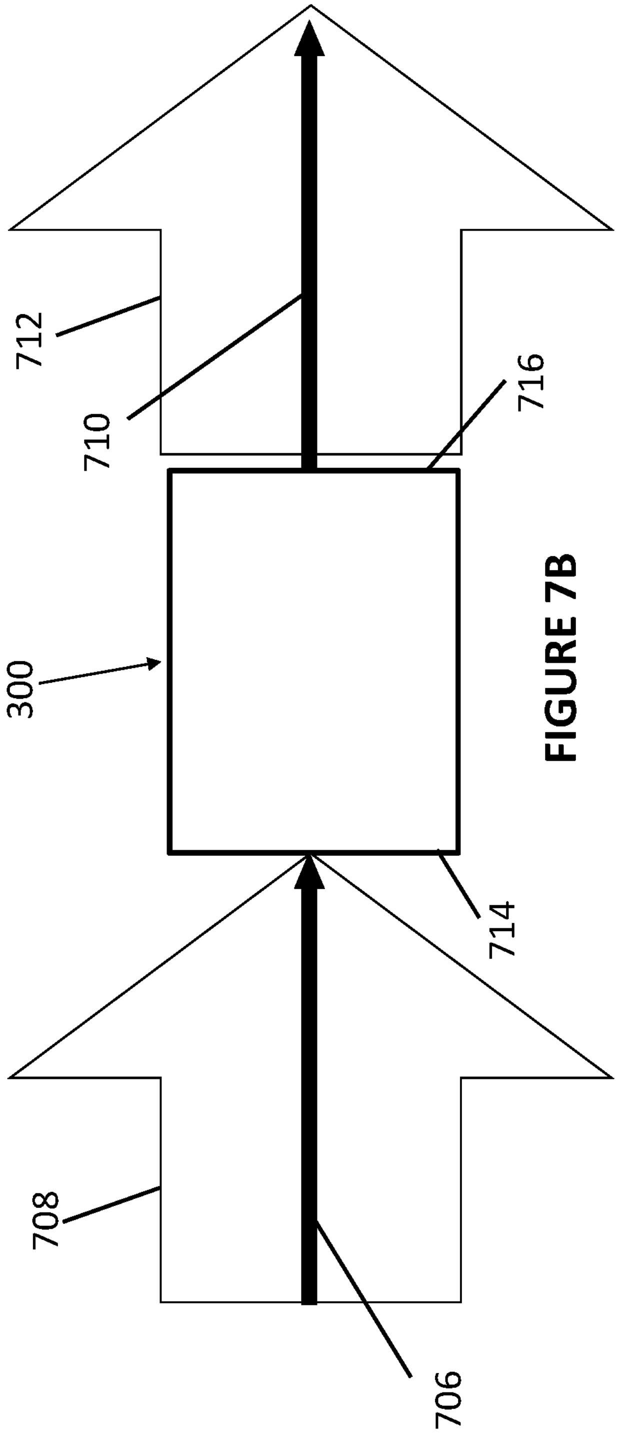
FIG. 7B illustrates transmission of two input light beams through an EVC interferometer where a cross-sectional area of one of the input light beams is larger than a cross-sectional area of the other input light beam.

FIG. 7B illustrates transmission of two input light beams (e.g., input laser beams) 706/708 through an EVC 300 where a cross-sectional area and/or diameter of the first input light beam 708 is larger than a cross-sectional area and/or diameter of the second input light beam 706. In some cases, the diameter of the first input light beam 708 can be larger than 50%, 70%, or 90% (but potentially smaller than 100% or any range formed by any of these values) of a cross-sectional area of the EVC along a direction perpendicular to the direction of propagation of the first input light beam 708. In some cases, the diameter of the second input light beam 706 can be smaller than 50% of the cross-sectional area of the EVC along a direction perpendicular to the direction of propagation of the second input light beam 706. In some cases, the diameter of the second input light beam 706 can be smaller than 2 millimeters, 1 millimeters, 500 microns, 300 microns, 100 microns, 50 microns, or smaller values.

In various implementations, the spectral reflectivity of the first reflective surface 714 and the second reflective surface 716 of the EVC 300 (e.g., side wall surfaces), may be tailored such that the first input light beam 708 (e.g., laser beam) having a first wavelength becomes resonant inside the EVC 300 and the second input light beam 706 having a second wavelength passes through the EVC 300 without becoming resonance. In some cases, the first 714 and the second 716 reflective surfaces may have a spectral reflectivity comprising a first spectral region and second spectral region, where the reflectivity of the first and the second reflective surfaces for light having a wavelength within the first spectral region is lower than their reflectance for light having a wavelength within the second spectral region. In some such cases, the first wavelength can be within the second spectral region and the second wavelength can be within the first spectral region. In some examples, the reflectance of the first 714 and the second 716 reflective surfaces can be less than 20%, 10%, 5%, 1%, or smaller in the first spectral region or any range formed by any of these values and larger than 70%, 80%, 90%, or larger in the second spectral region or any range formed by any of these values. As such, the first light input beam 708 may become resonant inside the EVC 300 while the second light beam 706 may pass through the EVC 300 without becoming resonant.

In some implementation the spectral reflectance of the first 714 and the second 716 reflective surfaces may include three non-overlapping spectral regions where the wavelengths within the second spectral region are smaller than the wavelengths within the first spectral region and the wavelengths within the third spectral region are larger than the wavelengths within the first spectral region. In some cases, the reflectance of the first 714 and the second 716 reflective surfaces within the first spectral region can be larger than their reflectivity within the third and the second spectral regions. For example, the reflectivity of the first 714 and the second 716 reflective surfaces within the first spectral region can be larger than 70%, 80%, 90%, or larger (but potentially less than 100%) or any range formed by any of these values and their reflectivity within the third and the second spectral regions can be less than 20%, 10%, 5%, 1% and lower or any range formed by any of these values. In some other cases, the reflectivity of the first 714 and the second 716 reflective surfaces within the first spectral region can be smaller than their reflectivity within the third and the second spectral regions. For example, the reflectivity of the first 714 and the second 716 reflective surfaces within the first spectral region can be smaller than 10% and their reflectivity within the third and the second spectral regions can be larger than 90%.

Figure 7C:
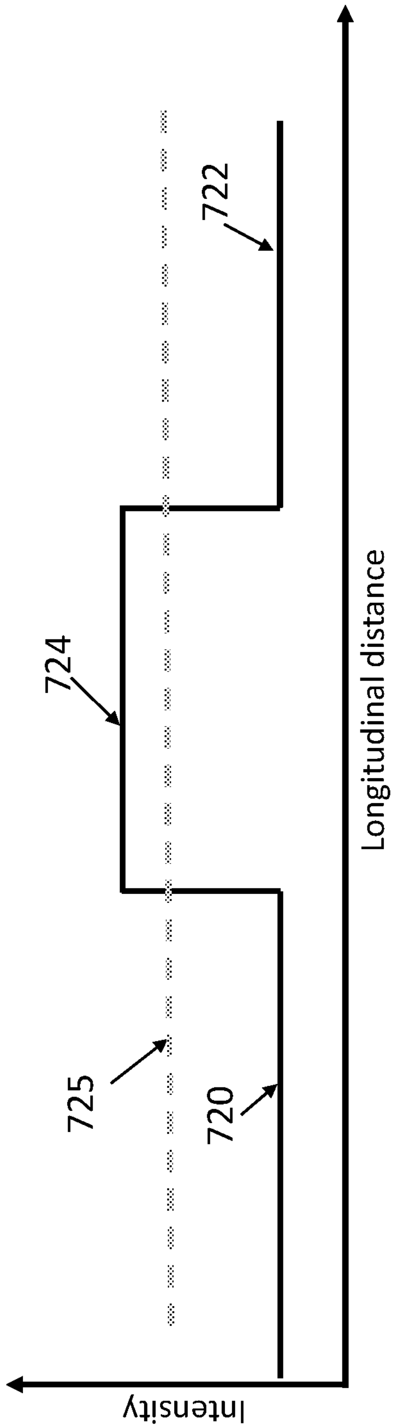
FIG. 7C illustrates variation of optical intensity along an optical path passing through an EVC for an input light beam that passes through the EVC without resonance (dashed line), and another input light beam that resonates inside the EVC (solid line).

FIG. 7C illustrates the variation of optical intensity along an optical path passing through an EVC for the first input light beam 708 that resonates inside the EVC 300 (solid line) and the second input light beam 706 that passes through the EVC 300 without resonance (dashed line). For the first input light beam 708, the optical intensity may change from a lower value 720 (solid line) before, of the first input light beam 708 enters, the EVC 300, increases to a higher value 724 inside the EVC 300, and decreases back to a lower value 722 after passing through the EVC 300. In some cases, the optical intensity 722 of a transmitted light beam 712 generated by the first light beam 708 can be substantially equal or lower than the optical intensity 722 of the first input light beam 708. The optical intensity 724 of the first input light beam 708 inside the EVC 300 may be larger than the optical intensity 725 of the second input light beam 706 that may not significantly change along the optical path. In some cases, the optical intensity of the transmitted light beam 710 generated by the second light beam 706 can be substantially equal or lower than the optical intensity of the second input light beam 706.

In some examples, a diameter of a first input laser beam incident on an EVC that becomes resonant inside the EVC may be larger than the diameter of a second input laser beam incident on the same or a different cell wall, that does not become resonant inside the EVC. In some cases, the laser line of the first input laser beam may at least partially overlap with a transmission peak of an etalon formed by EVC cell walls while the laser line of the second input laser beam may not overlap with transmission peak of any etalon formed by the EVC cell walls. In some cases, a diameter (e.g. a waist diameter) of the first input laser beam may be larger than 50%, 70%, or 100% of a width of a cell wall or reflective surface of the EVC on which the first input laser beam becomes incident or any range formed by any of these values. In some cases, a cross-sectional area of the first input laser beam may be larger than 50%, 70%, or 100% of a cross-sectional area of a cell wall or reflective surface of the EVC on which the first input laser beam becomes incident or any range formed by any of these values. In some cases, a beam waist or diameter of the second input laser beam may be smaller than 50%, 25%, or 10% of a width of a cell wall or reflective surface of the EVC on which the second input laser beam becomes incident. In some cases, a beam waist of diameter of the second input laser beam may be smaller than 2 millimeters, 1 millimeter, 500 microns, 400 microns, 300 microns, 200 microns, 100 microns or 50 microns (but larger than 10 nm) or any range formed by any of these values.

In some implementations, the first and the second reflective surfaces 507, 508 or 607, 608, or third and fourth reflective surfaces 612, 613 may comprise one or more features described above with respect to the first and the second reflective surfaces 714, 716. Accordingly, propagation of light beams through the first and second surfaces 507, 508 of the EVC 500, through the first and second surfaces 607, 608 of the EVC 600, or through the third and fourth surfaces of EVC 600, may comprise one or more features described above with respect to propagation of the first input light beam and the second input light beam 706, 708 through the EVC 300.

In some cases, one or more surfaces of an EVC may be coated with one or more dielectric layers to support resonance for a first input laser beam having a first wavelength and allow a second input laser beam having a second wavelength to pass through the EVC without resonance.

In various implementations described above, a temperature control system may control the temperature of the EVC. In some cases, the temperature control system may include a heating element (e.g., an electrical resistor) or a thermoelectric module (e.g., a Peltier) configured to heat or cool the EVC by heating or cooling at least a cell wall of the EVC. In some cases, the heating element or a thermoelectric module may be in physical contact with the EVC. In some cases, a temperature sensor (e.g., a thermistor) may be used to measure the temperature of a cell wall. In various configurations described above, the temperature control system may be used to tune the peak wavelengths of the transmission peaks of an etalon of the EVC. In some examples, the temperature control system may be used to control a spectral distance between the wavelength of an input laser beam and a transmission peak of the etalon. In some examples, the temperature control system may be used to control a spectral distance between the peak atomic wavelength (e.g., peak absorption wavelength) of an atomic line and a transmission peak of the etalon.

Temperature Monitoring and Control Using Etalons

In some cases, EVCs or other cells (e.g., vacuum cells), or other optical devices comprising one or more etalons may be used for applications other than those that may benefit from enhanced interaction of input laser beams with the atoms contained inside the cell (e.g., inside the EVC). In some such cases, various features of resonant optical modes supported by the etalon may be used for controlling or enhancing different interactions. For example, in some cases the temperature of a vapor cell or a vacuum enclosure may need to be controlled and stabilized without using electrical heaters, electrical temperature sensors (e.g., Resistive Temperature Detectors or RTDs), or other methods that require a heating or a sensing element to be in physical contact with the cell.

In some implementations, one or more designs and configurations discussed above may be used to optically monitor and control the temperature of a vacuum or a vapor cell. In some cases, the cell may comprise at least one etalon formed between two cell walls. In some such cases, a first optical source (e.g., a probe laser source) having a stable wavelength may be used as a thermal (or dimensional) probe to monitor the temperature of the cell based on the spectral location of a transmission peak of the corresponding etalon (changes of the peak wavelength may indicate a change of temperature). In some examples, the wavelength of the first optical source may be within a transmission peak of the etalon. The transmission (or reflection) of the light generated by the first optical source through (or off of) the etalon may be detected by a photodetector to generate a feedback signal that indicates the temperature of the cell or a change of the temperature of the cell. In some cases, the feedback signal may be provided to an optical heating system to control the temperature of the cell. In some examples, the optical heating system may comprise a second light source (a pump laser source) having a wavelength that is highly absorbed by a material incorporated into or coated onto a cell wall vapor or surface of the cell. As such, when illuminated by the light generated by the second light source (e.g., a laser source), the cell wall or cell surface may heat up and the temperature of the cell may increase. In some cases, one or more cell walls of an EVC may comprise materials that strongly absorb light having wavelength within a linewidth of the pump laser line.

Example material that can be incorporated in the cell wall to make it absorptive in the near infrared wavelength may include phthalocyanines, Indium Tin Oxide, Antimony Tin Oxides, Erbium doped Aluminum Oxide, Doped Tungsten Oxides, various conductive organics, optically black plastics, optically black paints or epoxies or other materials. In some cases, a cell wall may comprise a meta material (e.g., a structured meta material), configured to absorb light generated by the second light source. In some cases, one or more layers comprising the materials mentioned above may be deposited on cell wall to absorb light generated by the second source and generate heat. In some such examples, the number of layers, thickness of each layer and composition of each layer may be tailored to provide desired optical absorption and heating effects. In some cases, an optically absorptive layer (e.g., comprising a doped dielectric such as glass or polymer), may be bonded to one or more cell walls of the EVC to make the cell wall optically absorptive and enable optical temperature control as described above.

In some implementations, the wavelengths of the first source (probe source) used for temperature monitoring and the second source (pump source) used for and heating respectively, can be significantly detuned (e.g., by hundreds of nm) away from any relevant atomic transition line for the species of interest in the cell to avoid any unwanted coupling with the atomic sensor system. In some examples, the heating and/or temperature measurement optical beams (generated by the second and the first source respectively), can propagate along the same direction as the laser beam(s) tuned to the atomic line(s)/feature(s), or could propagate along different directions (e.g., orthogonal or non-parallel directions) with respect to the laser beam(s) tuned to the atomic line(s)/feature(s).

In various configurations described above, an input laser beam may be generated by a wavelength tunable laser source. In some examples, the laser wavelength may be tuned to control the spectral distance between the wavelength of the input laser beam and a transmission peak of an etalon of the EVC. In some examples, the laser wavelength may be tuned to control the spectral distance between the peak absorption wavelength of an atomic line and the laser wavelength.

Method of Fabrication of an EVC

In some implementations, the etalon vapor cells (EVCs) described above may comprise a hermetically sealed chamber filled with a vapor or vapor mixture. The vapor or vapor mixture may comprise atoms of the same or different types in gas phase. As described above to support optical resonance inside the EVC, the EVC may comprise at least two substantially parallel reflective surfaces that form an etalon. In some cases, the reflective surfaces of the EVC may comprise coated (HR coated) surfaces of two cell walls that form the chamber and face each other.

Figure 8C:
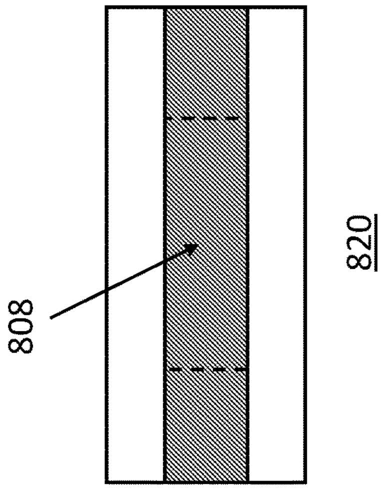
FIG. 8C illustrates a side view of an example EVC fabricated by bonding the layers shown in FIG. 8A.
Figure 8B:
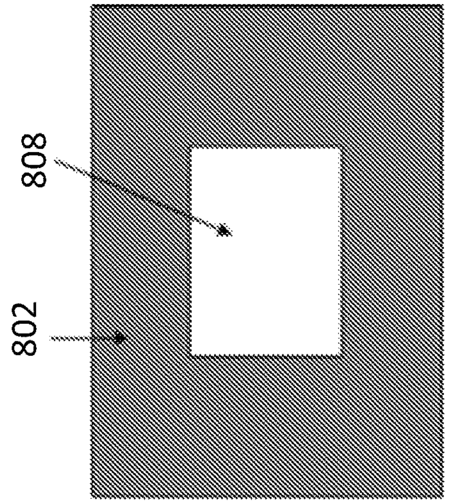
FIG. 8B illustrates a top view of the core layer shown in FIG. 8A.
Figure 8A:
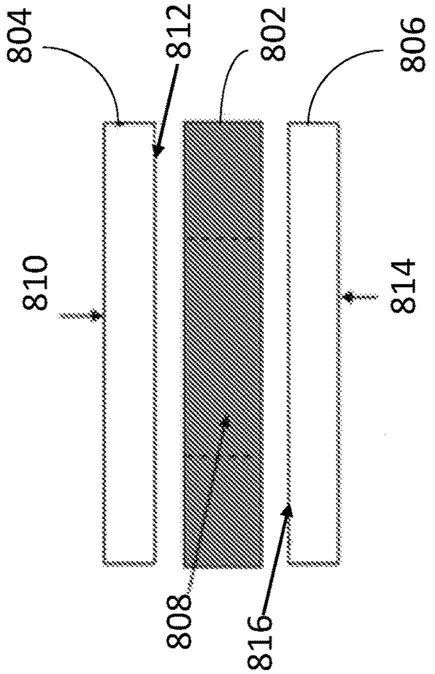
FIG. 8A illustrates a side view of a top layer, a core layer, and a bottom layer that are aligned to form an EVC.

In some examples, an EVC may comprise two layers (e.g., a top and a bottom layer) bonded on two sides of a core layer. The core layer may comprise at least one hole or opening. One or more hermetically sealed gas or vapor chambers may comprise the portions of the top and bottom layers covering the hole(s) and the side surfaces of the hole(s). An example method of fabrication of such an EVC comprising one chamber is shown in FIG. 8A. The chamber may be formed by bonding a core layer 802 (e.g., a silicon slab) containing a hole or opening (e.g., opening 808 in the core layer 802) to a top layer 804 and a bottom layer 806. FIG. 8B shows a top view of the core layer 802 having a single rectangular opening 808. In various implementations, the core layer 802 may include two or more opening having similar or different shapes. In some cases, the top layer 804 and/or the bottom layer 806 may comprise a sheet of glass or other materials. In some cases, a top surface of the core layer 802 may be bonded to an inner surface 812 of the top layer 804 and a bottom surface of the core layer 802 may be bonded to an inner surface 816 of the bottom layer 806. In some cases, bonding may comprise anodic bonding, spin on glass, or solder glass. In some cases, during bonding (e.g., anodic bonding) of the core layer 802 to the top and bottom layers 804/806 a chosen vapor (or gas) may be injected into the opening 808 and the bonding process (e.g., anodic bonding process) may seal the opening 808 such that the vapor is trapped in the opening 808 and the number of atoms in the resulting sealed chamber stays substantially constant over time. In some cases, the vapor may be injected to the opening 808 after bonding one of the top or bottom layers 804/806 to the core layer 802 and before bonding the other layer to seal the chamber. FIG. 8C shows the side view of an EVC 820 fabricated by bonding the layers shown in FIG. 8A. In some examples, the opening 808 of the EVC 820 may comprise a sealed chamber containing a plurality of atoms of the same or different types.

In some cases, a thickness of the core layer 802 in a direction perpendicular to the top and bottom surfaces of the core layer 802 may be configured such that at least one transmission peak of the EVC 820 (e.g., the etalon formed between the top and bottom layers 804/806) at least partially overlaps with an atomic line of an atom contained in the EVC 820.

In some implementations, one or more EVCs may be fabricated using a single core layer (e.g., a silicon wafer, or part of a silicon wafer), and individual EVCs may be diced out, after bonding the top and the bottom layer, for separate use. In some cases, individual EVCs may be fabricated on individual substrates. The glass and the silicon, can be planarized according to standard polishing techniques used in etalon fabrication. In some examples, highly reflective (HR) or partially reflective (PR) coating may be subsequently deposited on the outer surface of the top 804 and bottom 806 layers (e.g., glass layers) that are bonded to the core layer 802. For example, HR or PR coatings may be deposited on the outer surface 810 of the top layer 804 and the outer surface 814 of the bottom layer 806. In some cases, an antireflection (AR) coating may be deposited on the inner surfaces of the top and bottom layers bonded to the core layer. For example, AR coatings may be deposited on the inner surface 812 of the top layer 804 and the inner surface 816 of the bottom layer 806. In some cases, the AR coating can be lithographically patterned on the inner surface of the top layer 804 and bottom layer 806, to form coated and uncoated regions and to ensure pristine (uncoated) glass regions make contact with the silicon to allow anodic bonding. In other cases, the HR or PR coating may be disposed on the inner surfaces 812/816 of the top 804 and bottom 806 layers. In these cases, the HR or PR coating disposed on the inner surfaces 812/816 may be lithographically patterned to form coated and uncoated regions and to ensure pristine (uncoated) glass regions make contact with the silicon to allow anodic bonding. In some of these cases, AR coating may be uniformly deposited on the outer surfaces 810/814 of the top 804 and bottom 806 layers. The coatings on the outside surfaces 810/814 of the top 804 and the bottom 806 layers may be deposited prior to anodic bonding, or after bonding the top 804 and bottom 806 layers to the core layer 802. In some cases, the coatings on the outside surfaces 810/814 of the top 804 and the bottom 806 layers may be deposited prior to dicing the bonded layer and forming individual cells.

In some implementations, an EVC may be fabricated by glass welding or glass blowing or bonding using solder glass or spin-on glass. In these implementations, the inner cell walls may optionally be patterned lithographically prior to joining the walls to ensure pristine surfaces at the points of glass contact. After assembling the cell, additional polishing can be performed to ensure planarity of the outer walls, and the HR or PR reflective optical coatings can be applied to the finished cell, to ensure uniform etalon performance.

In various implementation, a highly reflective (HR) coating or surface may have an optical reflectance larger than 90%, 95%, 99%, 99.9%, 99.99%, or larger (but smaller than 100%) or any range formed by any of these values, for wavelengths within the operational wavelength range of the EVC. In some cases, a partially reflective (PR) surface or coating may have an optical reflectance from 50% to 60%, from 60% to 70%, from 70% to 80%, or from 80% to 90%, or any range formed by any of these values or possibly smaller or larger (but potentially less than 100%), for wavelengths within the operational wavelength range of the EVC. In various implementations, a low reflection or anti-reflection coating may have an optical reflectance less than 10%, less than 4%, less than 1%, or less than 0.1% (but larger than 0) or any range formed by any of these values.

In some cases, the spectral reflectance of an HR coating or a surface in which the HR coating is disposed may comprise non-overlapping high and low reflectivity spectral regions where a high reflectivity spectral regions has a reflectivity larger than 70%, 80%, 90%, 99.9%, 99.99%, or larger 99.99%, but smaller than 100% or any range formed by any of these values, and the low reflectivity spectral region has a reflectivity smaller than 20%, 10%, 5%, 1% or any range formed by any of these values or potentially smaller. In some cases, the spectral reflectance of an HR coating or a surface in which the HR coating is disposed may comprise one high reflectivity and one low reflectivity spectral regions, or two low reflectivity and one high reflectivity spectral regions.

In some implementations, the fabrication process of the EVC 820 may comprise disposing AR coatings (e.g., a patterned AR coatings) on the inner surface 812 of the top layer 804 and on the inner surface 816 of the bottom layer 806, and bonding the top layer 804 and the bottom layer 806 with the core layer 802 before disposing HR (or PR) coatings on the outer surface 810 and 814 of the top and bottom layers 804 and 806. In some cases, the bonding process (e.g., anodic bonding) may comprise injecting a chosen vapor (or gas) into the opening 808 and sealing the opening 808 such that the vapor is trapped in the opening 808 and the number of atoms in the resulting sealed chamber stays substantially constant over time. In some such cases, the fabrication process may further comprise adjusting a thickness (e.g., a distance between the outer surface 810 and the outer surface 814 along a direction substantially perpendicular to the outer surface 810 and the outer surface 814) of the resulting structure, by polishing the top layer 804 and/or the bottom layer 806 such that the thickness of the EVC 820 is substantially equal to a desired thickness. In some cases, adjusting the thickness of the EVC 820 may comprise adjusting an optical length and/or a roundtrip length of the EVC 820 and therefore adjusting the free spectral range of the EVC 820. In some cases, after polishing the top layer 804 and/or the bottom layer 806, HR (or PR) coatings may be disposed on the outer surfaces of the top layer 804 and the outer surface 814 of the bottom layer 806 to form the cavity (etalon) of the EVC 820. In some cases, the thickness (e.g, a desired thickness) of the EVC 820 may be such that the spectral distance between at least one EVC peak wavelength and a peak atomic wavelength is less than the 100%, 200%, 300%, 500% of the free-spectral-range (FSR) of the cavity formed between the outer surface 810 and the outer surface 814 or any range formed by any of these values.

Uniformity of Optical Power Distribution within EVC

In some cases, when the wavelength of an input laser beam incident on an EVC is substantially equal or very close to a peak absorption wavelength of an atomic line of a type of atom (e.g., the 795 nm or the 780 nm lines of Rubidium) that interact with the laser light coupled to the EVC, the strong optical absorption of the input laser beam by the atoms may reduce the number of resonant optical roundtrips of the laser beam inside the EVC. In some such cases, strong optical absorption of the laser beam inside the EVC may result in a highly non-uniform distribution of the optical intensity along the corresponding etalon. In these cases, the laser wavelength of an input laser beam incident on an EVC may be substantially equal to a peak wavelength of a transmission peak of the EVC. In some implementations, the wavelength of the input laser beam may be detuned from the peak absorption wavelength of an atomic line to make the optical intensity more uniform along the etalon, by reducing optical absorption and increase the number of resonant optical roundtrips. In some such implementations, the absorption of the laser light per unit length of the EVC may be reduced compared to a case where the laser wavelength is substantially equal to the peak absorption wavelength of the atomic line. In some examples, a detuning between the laser wavelength and the peak absorption wavelength of the atomic line may be from 1% to 5%, from 5% to 10%, from 10% to 50%, from 50% to 100%, from 100% to 150% from 150-500% of the atomic line or any range formed by these ranges or smaller or larger.

Figure 9:
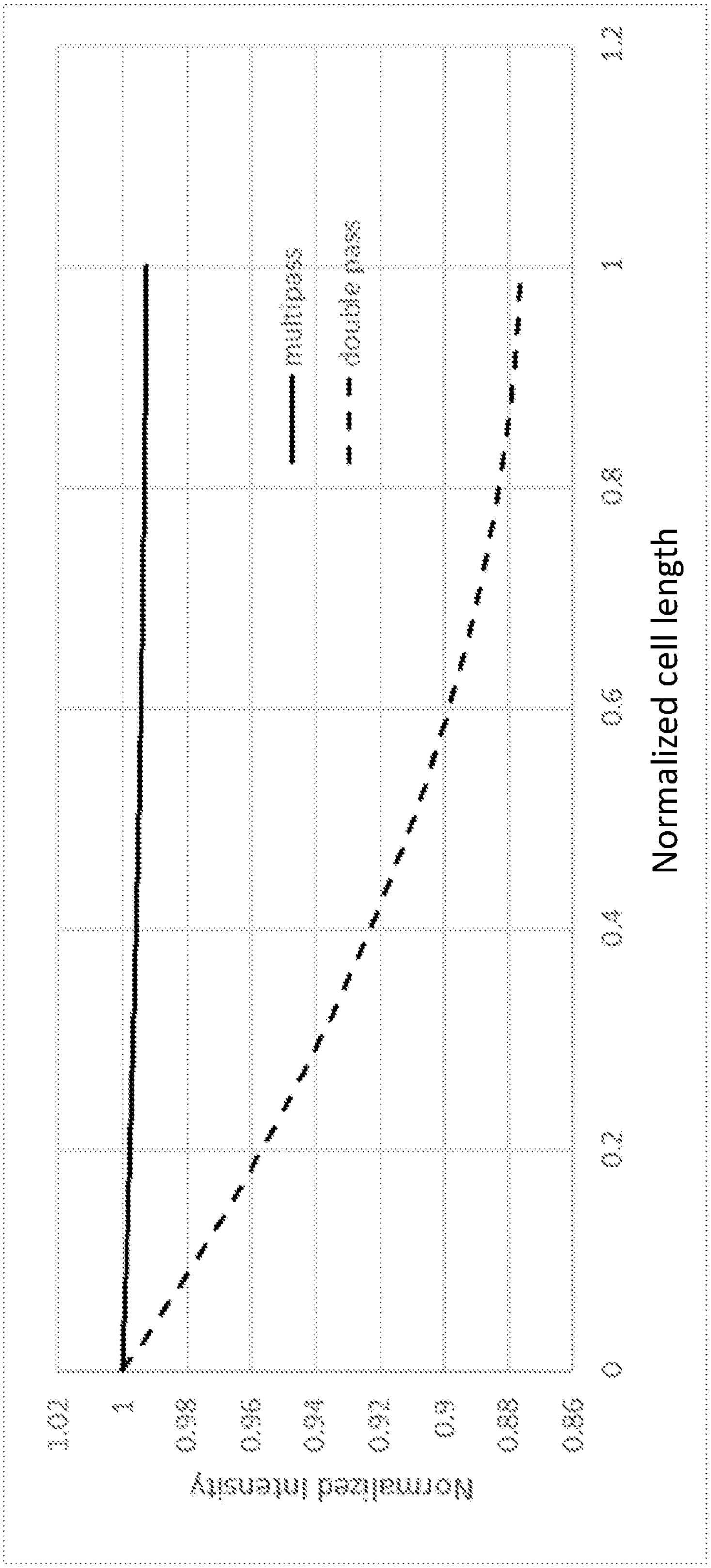
FIG. 9 illustrates normalized optical intensity inside a vapor cell in a double-pass arrangement (dashed line) and inside an EVC (solid-line), plotted against a longitudinal distance along the length of the vapor cell and EVC.

FIG. 9 shows the normalized calculated optical intensity plotted against a longitudinal distance from the entrance surface of a regular vapor cell, along a direction substantially perpendicular to the entrance surface), inside a double pass configuration (dashed line) where the wavelength of the input laser beam is partially absorbed by atoms contained inside the cell. FIG. 9 also shows the normalized calculated optical intensity of an EVC (solid line) where the wavelength of the input laser beam is detuned from the peak absorption wavelength of the atoms contained inside the EVC to reduce the optical absorption coefficient of the atoms for laser by a factor of 5 relative to the value used for the dashed line in FIG. 9. As shown in FIG. 9, detuning of the laser wavelength with respect to the peak absorption wavelength of the corresponding atomic line (solid line) has improved the uniformity of the optical intensity distribution along the EVC, compared to the optical intensity of the case where light passes through a cell two times (double pass configuration). The reduced interaction strength with the atomic absorption line when detuned from peak absorption may also be compensated by the higher optical intensity internal to the EVC.

Advantageously, by detuning the laser wavelength with respect to peak absorption wavelength but keeping it close the peak wavelength of an EVC transmission peak, the uniformity of light intensity distribution along the direction of propagation of laser light may be improved without reducing the strength of the interaction between the laser light and atoms. In some cases, the laser may be detuned from the peak absorption wavelength of the atomic line beyond an inflection point of the absorption line. In some cases, the detuning of the laser wavelength from the peak absorption wavelength of the atomic line can be larger than 100% of the atomic linewidth, larger than 200% of atomic linewidth or larger than 500% of the atomic linewidth (but potentially smaller than 100 microns) or any range formed by any of these values. In some cases, the detuning of the laser wavelength from the peak absorption wavelength of the atomic line can be configured to make the absorption of the laser wavelength less than 50%, 25%, 10%, or 1% of the peak absorption of the absorption line (but larger than 0) or any range formed by any of these values. In various implementations, Where the laser wavelength is detuned from the peak absorption wavelength of the atomic line, laser wavelength may be within the FWHM of a transmission peak of the. For example, a spectral distance between a laser wavelength that is detuned from the peak absorption wavelength of the atomic line and the peak absorption wavelength of the atomic line, can be less than 10%, or less than 1% of the FWHM of the transmission peak or any range formed by any of these values.

In some examples, the input laser beam can be circularly or linearly polarized light. In some applications, e.g., Nuclear Magnetic Resonance gyroscopes, the uniform distribution of optical intensity along EVC may result in a more uniform polarization of atoms across the cell.

In some implementations, the polarization of a linearly polarized light that interacts with the atoms (e.g., Rb atoms) in a vapor cell (e.g., an EVC) may be altered via light-atom interaction. Subsequently, the polarization of the laser light transmitted or reflected from the vapor cell may be measured with a polarimeter. In some cases, the polarimeter may comprise a polarization beam splitter and a pair of photodiodes. In some cases, the performance of an atomic sensor may be improved by detuning the laser wavelength from the peak absorption wavelength of the atom to allow a larger amount of light to be transmitted through the EVC. In some such cases, a peak wavelength of the EVC may be aligned (e.g., substantially equal) to the laser wavelength (that is detuned from the peak absorption wavelength). In some examples, the detuning from the peak absorption wavelength may enhance the strength of a signal indicating a polarization change (e.g., rotation) of the transmitted or reflected laser beam from the EVC, and/or enable operational the vapor cell at higher temperatures while supporting the generation of strong probe signal (e.g., originally using linearly polarized light.

In various implementations, any of the reflective surfaces of an EVC (e.g., reflective surface 301, 302, 507, 508, 607, 608 612, 613, 714, 716, 810, 812, 816, or 814), may have a reflectance from 60% to 70%, form 70% to 80%, from 80% to 90% from 90% to 90% to 99.999% or any range between or formed by any of these values or possibly smaller or larger (but potentially smaller than 100%), for wavelength within a spectral region. In some cases, the spectral region may comprise a portion of the operational wavelength range of the EVC.

In some cases, any of the reflective surfaces of an EVC may have different reflectivities in different spectral regions. In some cases, a reflective surface may have a spectral reflectance with low and high reflectivity spectral regions. For example, a reflective surface may have a low reflectance within a first spectral region and high reflectance within a second spectral region different from the first spectral region. In some cases, the first and the second spectral regions can be non-overlapping spectral regions. In some other examples, the reflectance of the reflective surface within the first spectral region can be larger than its reflectance in the second spectral region. In some examples, reflectivity of a first spectral region may not exceed 50% of the reflectivity of a second spectral region for wavelengths within the operating wavelength range of the optical system. In some cases, a reflective surface may have low reflectance within a first and a second spectral region and high reflectance within a third spectral region between the first and the second spectral regions where the first, second, and third spectral regions are non-overlapping spectral regions. In some examples, for wavelengths within the operating wavelength range of the optical system, reflectivity of the first and the second spectral regions may not exceed 50% of the reflectivity of the first and the second spectral regions.

In various implementations, a reflective surface may have a reflectance larger than 60%, 70%, 80%, 90%, 95%, or larger (but potentially smaller than 100%) within a high reflectivity spectral region or any range formed by any of these values. In various implementations, a reflective surface may have a reflectance smaller than 20%, 15%, 10%, 5%, or lower within a low reflectivity spectral region or any range formed by any of these values. In some examples, a spectral distance between the first and the second cutoff wavelength can be smaller than 20 nm, less than 15 nm, less than 10 nm, less than 5 nm, or less than 1 nm or any range formed by any of these values.

In some cases, the first spectral region may include wavelengths smaller than a first cutoff wavelength and the second spectral region may include wavelengths larger than a second cutoff wavelength wherein the second cutoff wavelength is larger than the first cutoff wavelength. In some cases, the first spectral region may include all wavelengths smaller than a first cutoff wavelength but larger than a lower bound wavelength. In some examples, a spectral distance between the lower bound wavelength and the first cutoff wavelength can be larger than 5×FSR, 10×FSR, 20×FSR, 50×FSR, 100×FSR, 200×FSR, 300×FSR, or larger (but potentially smaller than 1 meter) or any range formed by any of these values, where FSR is the free spectral range of the EVC or an etalon of the EVC that the corresponding reflective surface. In some cases, the second spectral region may include all wavelengths larger than a second cutoff wavelength but smaller than an upper bound wavelength. In some examples, a spectral distance between the upper bound wavelength and the second cutoff wavelength can be larger than 5×FSR, 10×FSR, 20×FSR, 50×FSR, 100×FSR, 200× FSR, 300×FSR, or 1000×FSR (but potentially smaller than 1 meter) or any range formed by any of these values.

In some examples, a width (e.g., a FWHM) of the third spectral region (also referred to as reflectance bandwidth) can be from 1 to 10 nm, 10 to 50 nm, 50 to 100 nm, 100 nm to 500 nm or any range between any these values or smaller or larger. In some cases, the spectral response of one or both surfaces of an etalon formed by the EVC surfaces may be configured such that both surfaces of the etalon are highly reflective for a first wavelength (or a first plurality of wavelengths) and at least one of the surfaces of the etalon has a low reflectivity (high transmission) for a second wavelength (or second plurality of wavelengths). For example, light having a first wavelength may become resonant inside an etalon of an EVC while a light having second wavelength may pass through both surfaces and is effectively transmitted through the EVC. As another example, light having a first wavelength may become resonant inside an etalon of an EVC, while light having a second wavelength may pass through a first surface of the etalon and may be reflected by the second surface of the etalon; as such the EVC may be an etalon for light having the first wavelength, and a double-pass cell for light having the second wavelength. In some cases, light beams having wavelengths that do not become resonant inside the EVC (are not in the etalon regime), may be tightly collimated (e.g., they may have a beam waist less than 2 millimeter, 1 millimeter, 500 microns, 400 microns, 300 microns, 200 microns, 100 microns, 50 microns, or smaller) or any range formed by any of these values.

Figure 10:
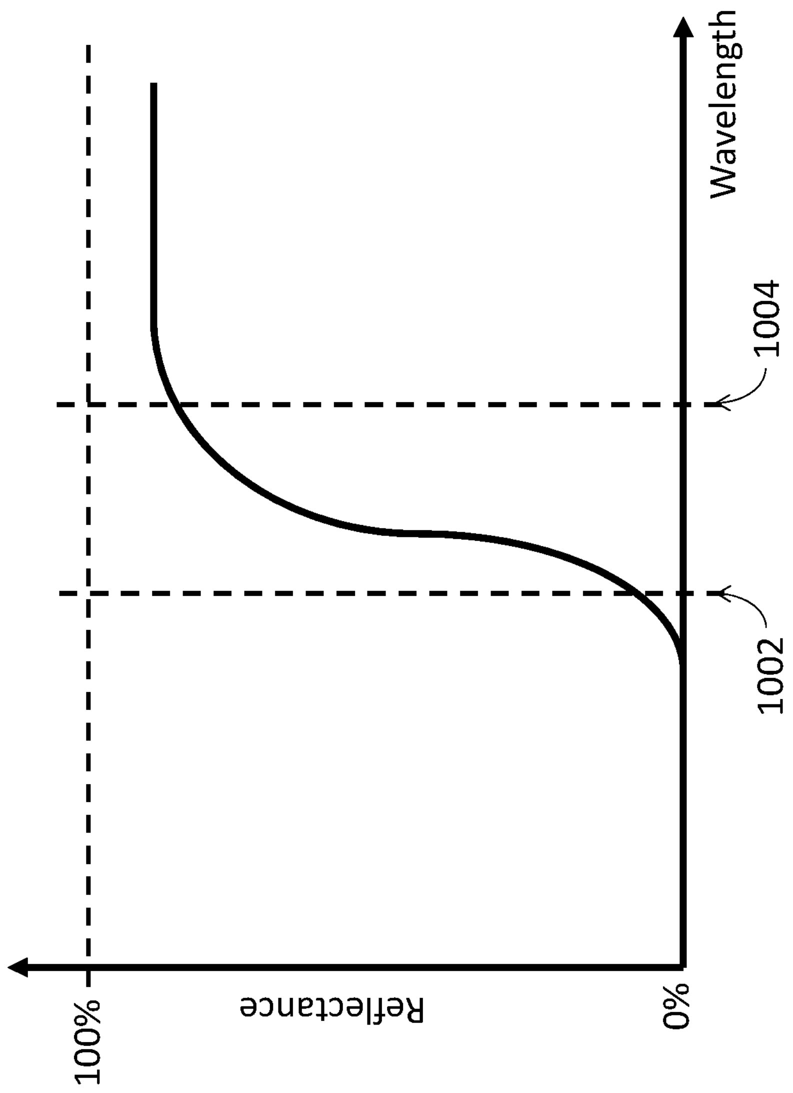
FIG. 10 illustrates an example reflection spectrum of a reflective surface of an EVC that includes high and low reflectivity spectral regions.

FIG. 10 illustrates an example spectral reflectance 1000 of a reflective surface of an EVC having a low reflectivity spectral region and a high reflectivity spectral region. The spectral reflectance 1000 shows a reflectance of the reflective surface plotted against wavelength. The low reflectivity spectral region may include wavelengths smaller than a first cutoff wavelength 1002 and the high reflectivity spectral region may include wavelengths larger than a second cutoff wavelength 1004. In some cases, one or both reflective surfaces of an etalon of an EVC may have a spectral reflectance similar to the spectral reflectance 1000. In some cases, the input surface of an EVC (e.g., the surface through which the light beams enter the EVC) may have a spectral reflectance similar to spectral reflectance 1000, and the output surface of the EVC may comprise a broadband high reflectivity surface (e.g., having high reflectance for all wavelengths incident on the EVC or within the operation wavelength range of the EVC).

In some implementations, one or both reflective surfaces of an etalon of the EVC may include a high and a low reflectivity spectral region. In some such cases, the spectral reflectivity of both reflective surfaces of the etalon can be similar or substantially the same.

Figure 11:
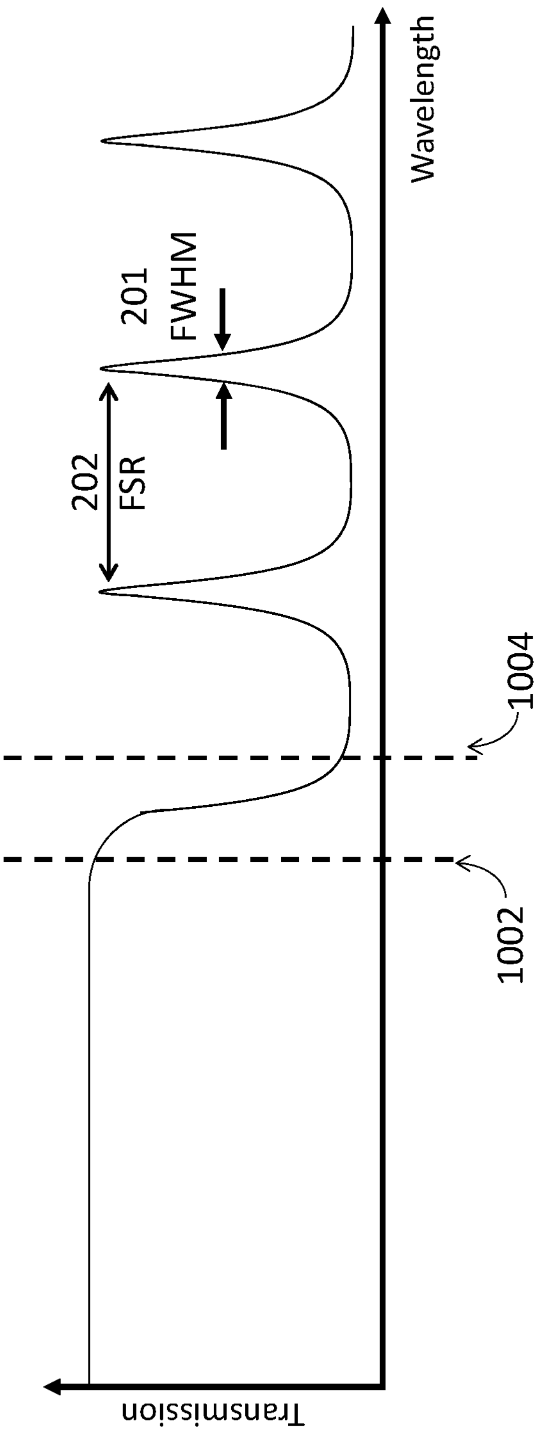
FIG. 11 illustrates an example transmission spectrum of an EVC that both of its reflective surfaces include a high and a low reflectivity spectral region.

FIG. 11 illustrates an example transmission spectrum for an EVC that both of its reflective surfaces have identical or nearly identical spectral reflectance similar to the spectral reflectance shown in FIG. 10. As shown, the transmission spectrum of the EVC for light having wavelengths larger than the second cutoff wavelength 1004 includes transmission peaks (indicative of resonant optical power build up inside the EVC), while light having a wavelength smaller than the first cutoff wavelength 1002, may pass through both surfaces without being reflected of with very low level of reflection.

In some cases, the second reflective surface may have high reflectivity over the entire operational wavelength range of the EVC and the first reflective surface may have a spectral reflectance similar to the spectral reflectance shown in FIG. 10. In some such cases, the EVC behaves like a double-pass cell for light having a wavelength less than the first cut off wavelength 1002 and like an Etalon for light having a wavelength larger than the second cutoff wavelength 1004.

In some examples, the first 1002 and the second 1004 cutoff wavelengths can be from 700 nm to 900 nm. For example, the first 1002 and the second 1004 cutoff wavelengths can be 785 nm and 790 nm respectively. As another example, the first 1002 and the second 1004 cutoff wavelengths can be 860 nm and 880 nm respectively.

Example Measurement Method

In some implementations, the EVC designs and the corresponding optical arrangements described above may be used to measure light-atom interactions. Light-atom interaction may comprise interaction between a first input laser beam having a first laser wavelength and atoms contained in the chamber of the EVC where the atoms have at least a first atomic line, where the first atomic line has a first atomic linewidth and a first peak atomic wavelength (e.g., a peak absorption wavelength, a peak polarization rotation wavelength, or a peak EIT wavelength). In some cases, the light-atom interaction may include interaction of the first input laser beam with an atomic line (e.g., an absorption line, a polarization rotation line, or an EIT line). In some examples, the EVC may include at least a first etalon formed between a first reflective surface and a second reflective surface, the first etalon having a first length. The first length can be a longitudinal distance between the first and the second reflective surfaces along a direction substantially perpendicular to the first and the second reflective surfaces. The transmission spectrum of the first etalon may comprise a first plurality of transmission peaks and respective peak wavelengths, where a first transmission peak of the plurality transmission peaks comprise a spectral region centered at an a first peak wavelength. The first transmission peak may have a first cavity linewidth equal to the FWHM of the first transmission peak. In some cases, the first length may be configured such that the first transmission peak at least partially overlaps with the first atomic line of an atom contained in the EVC. This initial partial overlap between the first transmission peak and the first atomic line may facilitate further alignment (e.g., by tuning the first transmission peak), to reduce the spectral distance between the first peak wavelength and the peak atomic wavelength below a desired value (e.g., 10% of the cavity linewidth).

In some cases, a reflectance of at least one of the first and the second reflective surfaces can be larger than 50% for light having wavelengths within a first spectral region and less than 10% for light having wavelengths within a second spectral region. In some such cases, the transmission of the first etalon for light having a wavelength within the second spectral region may be larger than 70%, 80%, 90%, or larger than 99.99% but smaller or equal to 100% or any range formed by any of these values.

In some cases, a wavelength tunable laser may be used to generate the first input laser beam. The first input laser beam may be directed to the first reflective surface of the EVC and becomes incident the first reflective surface at a first angle of incidence. In some cases, one or more optical components may be used to control the first input laser beam and direct it to the first reflective surface. In some cases, the first angle of incidence may be controlled by rotating the first input laser beam (e.g., by rotating the laser or using the one or more optical or opto-mechanical components). In some cases, the first angle of incidence may be controlled by rotating the EVC around an axis substantially perpendicular to the direction of propagation of the first input laser beam. In some examples, the first peak wavelength may be controlled or tuned by changing and the first angle of incidence.

In some examples, the first peak wavelength may be controlled or tuned by changing the corresponding optical path length. The optical path length may be tuned, e.g., by adjusting the temperature of the EVC that will affect the optical path via thermo-optic effect (e.g., a change in the refractive index of the gas) or thermal expansion of the first length. In some such examples, the temperature of the EVC may be controlled using a temperature control system. In some cases, the first peak wavelength may be tuned by controlling the temperature of the EVC and/or adjusting the first angle of incidence. In some cases, the temperature of the EVC and the first angle of incidence may be adjusted sequentially to make the spectral distance between the first peak wavelength and the first peak atomic wavelength close or substantially equal to a first desired value. In some cases, the temperature of the EVC and the first angle of incidence may be adjusted several times and in different orders to make the spectral distance between the first peak wavelength and the first peak atomic wavelength close or substantially equal to a first desired value.

In some cases, to enhance the interaction between the atom and the first input laser beam, the first peak wavelength may be tuned to increase the initial overlap between the first atomic line and the first transmission peak such that a spectral distance between the first peak atomic wavelength and the first peak wavelength becomes less than 10%, or less than 50% of the first cavity linewidth (the FWHM of the transmission peak).

Once the first peak wavelength is aligned with the first peak atomic wavelength, the first tunable laser may be tuned such that a spectral distance between the first peak atomic and the first laser wavelength becomes less than 10% of the first atomic linewidth to enhance the interaction between the atom and the first input laser beam. In some other examples, to enhance the interaction between the atoms and the first input laser beam and in the meantime make the distribution of optical intensity along the etalon uniform, the first tunable laser may be tuned such that a spectral distance between the first peak atomic wavelength and the first laser wavelength becomes larger than 50% of the first atomic linewidth but less than 400% of the first atomic linewidth.

In some cases, a spectral distance between the first laser wavelength and the first peak wavelength may be maintained below 50% of the first cavity linewidth.

In some implementations, once the first laser wavelength and the first transmission peak are aligned with the atomic line, a first photodetector may be used to measure the intensity of a portion of the first input laser beam transmitted through the EVC via the first etalon (e.g., entering and exiting the first etalon via (or from) the first and the second reflective surfaces respectively). In some other implementations, the first photodetector may be used to measure the intensity of a portion of the first input laser beam reflected by the first reflective surface of the EVC.

In some implementations, light atom-interaction may further comprise interaction between a second input laser beam having a second laser wavelength and atoms contained in the chamber of the EVC where the atoms have at least a second atomic line where the second atomic line has a second atomic linewidth and a second peak atomic wavelength. In some cases, the first and the second atomic lines may comprise atomic lines of the same type of atoms or different types of atoms.

In some cases, a second wavelength tunable laser source may be used to generate a second input laser beam having a second laser wavelength. In some such case, the second input laser beam may be directed to the first reflective surface of the first etalon at a second angle of incidence. In some cases, a second peak wavelength of the first plurality of transmission peaks may be tuned such that a spectral distance between the second peak atomic wavelength and the second peak wavelength is less than 10% of the second cavity linewidth. In some such cases, the second transmission peak may comprise a spectral region centered at a second peak wavelength and may have a second cavity linewidth. In some cases, the second peak wavelength may be adjusted or tuned the temperature control system and/or adjusting the second angle of incidence.

In some cases, the temperature the first angle of incidence, and the second angle of incidence may be adjusted sequentially to make the spectral distance between the first peak wavelength and the first peak atomic wavelength close or substantially equal to a first desired value and the spectral distance between the second peak wavelength and the second peak atomic wavelength close or substantially equal to a second desired value. In some cases, the temperature, the second angle of incidence and the first angle of incidence may be adjusted several times and in different orders to make the spectral distance between the first peak wavelength and the first peak atomic wavelength close or substantially equal to a first desired value and the spectral distance between the second peak wavelength and the second peak atomic wavelength close or substantially equal to a second desired value.

In some cases, the second laser wavelength may be adjusted such that a spectral distance between the second peak wavelength and the second laser wavelength is less than 10% of the second cavity linewidth. In some such cases, the second laser wavelength may be further adjusted to make the spectral distance between the second peak atomic wavelength and the second laser wavelength less than 10% of the second atomic linewidth.

In some cases, the second laser wavelength may be adjusted such that the second laser wavelength is within the second spectral region. In some such cases, the second input laser beam may pass through the first etalon without becoming resonant inside the first etalon.

In some implementations, once the second laser wavelength and the second transmission peak are aligned with the second atomic line, a second photodetector may be used to measure the intensity of a portion of the second input laser beam transmitted through the EVC via the first etalon (e.g., entering and exiting the first etalon via (or from) the first and the second reflective surfaces respectively). In some other implementations, the second photodetector may be used to measure the intensity of a portion of the second input laser beam reflected by the first reflective surface of the EVC.

In some cases, the EVC may include a second etalon formed between a third and a fourth reflective surfaces. The second etalon may have a second length. The second length can be a longitudinal distance between the third and the fourth reflective surfaces along a direction substantially perpendicular to the third and fourth reflective surfaces. In some cases, the first length can be different than the first length. The transmission spectrum of the second etalon may comprise a second plurality of transmission peaks including a third transmission peak having a third peak wavelength a third cavity linewidth equal to the FWHM of the third transmission peak. In some cases, the second length may be configured such that the third transmission peak at least partially overlaps with a third atomic line of an atom contained in the EVC. In some cases, the third atomic line may comprise the second atomic line.

In some cases, one or more polarization controllers or polarization analyzers may be positioned between the optical path between the first tunable laser and the first photodetector and/or between the optical path between the second tunable laser and the second photodetector, to control the polarization of the first and the second input laser beams and measure the intensity of a selected polarization state of the transmitted portions of the first and the second input laser beams. In some cases, the polarization analyzer may consist of an optional waveplate followed by a polarization beam splitter and two detectors, one for each beam.

In some cases, alternatively or in addition to the second input laser beam, a third input laser beam having a third laser wavelength may be generated by a third tunable laser and directed to a third reflective surface to become incident on the third reflective surface with a third angle of incidence.

In some cases, the third peak wavelength may be tuned by controlling the temperature of the EVC and/or adjusting the third angle of incidence. In some cases, to enhance the interaction between the atom and the third input laser beam, the third peak wavelength may be tuned to increase the initial overlap between the third atomic line and the third transmission peak such that a spectral distance between the third peak atomic wavelength and the third peak wavelength becomes less than 10% of the third cavity linewidth (the FWHM of the transmission peak). In some examples, aligning the third peak wavelength with the third atomic wavelength may be performed using the methods described above with respect to aligning the first and second peak wavelength with the first and second atomic wavelengths.

Once the third peak wavelength is aligned with the third peak atomic wavelength, the third tunable laser may be tuned such that a spectral distance between the third peak atomic wavelength and the third laser wavelength is less than 10% of the third atomic linewidth to enhance the interaction between the atom and the third input laser beam. In some other examples, to enhance the interaction between the atom and the third input laser beam and in the meantime make the distribution of optical intensity along the third etalon uniform, the third tunable laser may be tuned such that a spectral distance between the third peak atomic wavelength and the third laser wavelength becomes larger than 50% of the first atomic linewidth but less than 400% of the first atomic linewidth.

In some cases, a spectral distance between the third laser wavelength and the third peak wavelength may be maintained below 50% of the third cavity linewidth.

In some cases, a reflectance of at least one of the third and the fourth reflective surfaces can be larger than 50% for light having wavelengths within a third spectral region and less than 10% for light having wavelengths within a fourth spectral region. In some such cases, the transmission of the second etalon for light having a wavelength within the fourth spectral region may be larger than 70%, 80%, 90%, 99%, or larger than 99.99%, but smaller or equal to 100% or any range formed by any of these values.

In some cases, the third laser wavelength may be adjusted such that the third laser wavelength is within the fourth spectral region. In some such cases, the third input laser beam may pass through the second etalon without becoming resonant inside the second etalon.

In some implementations, once the third laser wavelength and the third transmission peak are aligned with the atomic line, a third photodetector may be used to measure the intensity of a portion of the third input laser beam transmitted through the EVC via the third etalon. In some other implementations, the third photodetector may be used to measure the intensity of a portion of the third input laser beam reflected by the third reflective surface of the EVC.

In some cases, one or more polarization controllers or polarization analyzers may be positioned between the optical path between the first tunable laser and the first photodetector and/or between the optical path between the third tunable laser and the third photodetector, to control the polarization of the first and third input laser beams and measure the intensity of a selected polarization state of the transmitted portions of the first and the third input laser beams. In some cases, the polarization analyzer may consist of an optional waveplate followed by a polarization beam splitter and two detectors, one for each beam.

In some cases, a diameter (e.g. a waist diameter) of the first input laser beam may be larger than 50%, 70%, or 100% (but potentially smaller than 1000%) or any range formed by any of these values of a width of a cell wall or reflective surface of the EVC on which the first input laser beam becomes incident. In some cases, a cross-sectional area of the first input laser beam may be larger than 50%, 70%, or 100% (but potentially smaller than 1000%) or any range formed by any of these values of a cross-sectional area of a cell wall or reflective surface of the EVC on which the first input laser beam becomes incident. In some cases, a beam waist or diameter of the second and/or the third input laser beams may be smaller than 50%, 25%, or 10% or any range formed by any of these values of a width of a cell wall or reflective surface of the EVC on which the second and/or the third input laser beams becomes incident. In some cases, a beam waist of diameter of the second and/or the third input laser beams may be smaller than 2 millimeters, 1 millimeter, 500 microns, 400 microns, 300 microns, 200 microns, 100 microns or 50 microns or any range formed by any of these values.

Various configurations and measurements described above with respect to alignment between an absorption line of an atom (having a peak atomic wavelength and an absorption linewidth), with a peak wavelength and a laser wavelength, may be applicable to the alignment between a polarization rotation line of an atom (having a peak polarization rotation wavelength and a polarization rotation linewidth), with a peak wavelength and a laser wavelength.

Various configurations and measurements described above with respect to alignment between an absorption line of an atom (having a peak atomic wavelength and an absorption linewidth), with a peak wavelength and a laser wavelength, may be applicable to the alignment between an EIT line (having a peak EIT wavelength and an EIT linewidth), with a peak wavelength and a laser wavelength.

In various implementations, a chamber of the EVC(s) 300, 600, or 500, may comprise a volume between the reflective surfaces 507-508, 301-302, 607-608, or 612-613 bound by one or more chamber surfaces. In some cases, the at least one of the chamber surfaces may comprise one of the reflecting surfaces that form the corresponding Etalon. In some cases, at least one of the reflecting surfaces that form the corresponding Etalon can be an outer surface of a cell wall where the corresponding internal surface of the cell wall comprises a chamber surface. In some such cases, the corresponding internal surface of the cell may be AR coated. In some cases, a chamber the EVC(s) 300, 600, or 500, may be formed, aligned, or otherwise positioned between two reflective surfaces that form the corresponding Etalon, such that at least a portion of the volume (internal volume) of the chamber overlaps with a resonant optical mode of EVC (e.g., an optical mode formed or supported by the two reflective surfaces). In some cases, a chamber the EVC(s) 300, 600, or 500, may be formed, aligned, or otherwise positioned between two reflective surfaces that form the corresponding Etalon, such an optical mode of EVC (e.g., an optical mode formed or supported by the two reflective surfaces) at least partially resides in the chamber. In some such cases, a chamber surface that separates a portion of optical mode residing inside the chamber from the portion of the optical mode residing outside of the chamber, may be AR coated.

Example Embodiments

Example embodiments described herein have several features, no single one of which is indispensable or solely responsible for their desirable attributes. A variety of example systems and methods are provided below.

Example 1. An optical system comprising:

a first laser source configured to generate a first input laser beam having a first laser wavelength within an operating wavelength range of the optical system;

an etalon vapor cell (EVC) comprising:

a first reflective surface, a second reflective surface, a first etalon formed between the first reflective surface and the second reflective surface, the first etalon having a first length and a first plurality of transmission peaks and respective peak wavelengths, wherein a first transmission peak of the plurality transmission peaks comprises a spectral region centered at a first peak wavelength, the first transmission peak having a first cavity linewidth;

a chamber containing atoms, said atoms having a first atomic line, said first atomic line having a first atomic linewidth and a first peak atomic wavelength;

wherein an internal volume of the chamber at least partially overlaps with a resonant optical mode of the first etalon.

wherein the first input laser beam is incident on the first reflective surface;

wherein the first atomic line at least partially overlaps with the first transmission peak; and wherein the laser wavelength is within the first transmission peak and the first atomic line.

Example 2. The optical system of Example 1, wherein a difference between the first laser wavelength and the first peak atomic wavelength is smaller than the first atomic linewidth.

Example 3. The optical system of Example 1, wherein a difference between the first laser wavelength and the first peak wavelength is smaller than the first cavity linewidth.

Example 4. The optical system of Example 1, wherein a difference between the peak wavelength and peak atomic wavelength is smaller than the cavity linewidth.

Example 5. The optical system of Example 1, wherein a difference between the first laser wavelength and the first peak atomic wavelength is larger than the first atomic linewidth.

Example 6. The optical system of Example 1, further comprising a first photodetector configured to receive a transmitted laser beam exiting the EVC via the second reflective surface.

Example 7. The optical system of Example 6, further comprising a second photodetector configured to receive a reflected laser beam reflected from the first reflective of the EVC.

Example 8. The optical system of Example 1, further comprising:

an optical reflector configured to reflect a transmitted laser beam exiting the EVC via the second reflective surface back to the second reflective surface, and a photodetector configured to receive a reflected laser beam reflected from the first reflective of the EVC.

Example 9. The optical system of any of Examples 6-8, wherein the first input laser beam is incident on the first reflective surface at an angle of incidence between 0.5 degrees and 20 degrees.

Example 10. The optical system of any of Examples 7 and 8, further comprising a beam splitter configured to redirect the reflected laser beam toward the photodetector or the second photodetector.

Example 11. The optical system of Example 1, wherein the first input laser beam is incident on the first reflective surface at an angle of incidence between 0.1 degrees and 10 degrees.

Example 12. The optical system of Example 1, further comprising a second laser source configured to generate a second input laser beam having a second laser wavelength different from the first laser wavelength, wherein the second input laser beam enters the chamber via a surface of the EVC.

Example 13. The optical system of Example 12, wherein the second input laser beam is incident on a reflective surface different from the first and the second reflective surfaces.

Example 14. The optical system of Example 12, wherein the second input laser beam is incident on the first reflective surface.

Example 15. The optical system of Example 12, wherein the second laser wavelength is within the first atomic line.

Example 16. The optical system of Example 12, wherein the second laser wavelength is within the first transmission peak of the first plurality of transmission peaks.

Example 17. The optical system of Example 12, wherein:

the atoms further have a second atomic line, a second atomic linewidth, and a second peak atomic wavelength, and wherein the second laser wavelength is within the second atomic line.

Example 18. The optical system of Example 17, wherein the second atomic line at least partially overlaps with a second transmission peak of the plurality of transmission peak:

Example 19. The optical system of Example 18, wherein the second laser wavelength is within the second transmission peak.

Example 20. The optical system of Example 12, wherein at least one of the first and the second reflective surfaces has a spectral reflectivity comprising at least two spectral regions having different reflectivities within the operating wavelength range of the optical system.

Example 21. The optical system of Example 1, wherein a reflectance of at least one of the first and the second reflective surfaces is between 70% and 100% for light having wavelengths smaller than a first cutoff wavelength and between 1% and 20% for light having wavelengths larger than a second cutoff wavelength that is larger than the first cutoff wavelength.

Example 22. The optical system of Example 1, wherein a reflectance of at least one of the first and the second reflective surfaces is less than 20% for light having wavelengths smaller than a first cutoff wavelength and larger than 70% for light having wavelengths larger than a second cutoff wavelength that is larger than the first cutoff wavelength.

Example 23. The optical system of Example 1, wherein a reflectance of the first and the second reflective surfaces is larger than 70% for light having wavelengths larger than a first cutoff wavelength and smaller than a second cutoff wavelength that is larger than the first cutoff wavelength, less than 20% for light having wavelengths smaller than the first cutoff wavelength, and less than 20% for light having wavelengths larger than the second cutoff wavelength.

Example 24. The optical system of Example 14, wherein a cross-sectional area of at least one of the first input laser beam and the second input laser beam is larger than 50% of an area of the first reflective surface.

Example 25. The optical system of Example 24, wherein a beam waist of at least one of the first input laser beam and the second input laser beam is smaller than 100 microns.

Example 26. The optical system of Example 24, wherein a beam waist of at least one of the first input laser beam and the second input laser beam is smaller than 1 millimeter.

Example 27. The optical system of Example 12, wherein the first and the second reflective surfaces have a spectral reflectivity comprising a first spectral region and a second spectral region, and wherein:

the reflectivity of the first and the second reflective surfaces for light having a wavelength within the first spectral region is lower than their reflectivity for light having a wavelength within the second spectral region; and the first laser wavelength is within the second spectral region and the second laser wavelength is within the first spectral region.

Example 28. The optical system of Example 27, wherein a cross-sectional area of the first input laser beam is larger than 50% of an area of the first reflective surface and a beam waist of the second input laser beam is smaller than 1 millimeter.

Example 29. The optical system of Example 28, wherein the beam waist of the second input laser beam is smaller than 1 micron.

Example 30. The optical system of Example 12, wherein:

The etalon vapor cell (EVC) further comprises:

a third reflective surface, a fourth reflective surface, a second etalon formed between the third reflective surface and the fourth reflective surface, the second etalon having a second length and a second plurality of transmission peaks and respective peak wavelengths, wherein a second transmission peak of the plurality transmission peaks comprises a spectral region centered at a second peak wavelength, the second transmission peak having a second cavity linewidth;

wherein the chamber further comprises the third and fourth reflective surfaces;

wherein the second input laser beam is incident on the third reflective surface; and wherein the second input laser wavelength is within the second transmission peak.

Example 31. The optical system of Example 30, wherein the first length is different from the second length.

Example 32. The optical system of Example 30, wherein the second input laser wavelength is within the first atomic line.

Example 33. The optical system of Examples 30, wherein the atoms further have a second atomic line, a second atomic linewidth, and a second peak atomic wavelength.

Example 34. The optical system of Example 33, wherein the second laser wavelength is within the second atomic line.

Example 35. The optical system of Example 34, wherein a difference between the second laser wavelength and the second peak atomic wavelength is smaller than the second atomic linewidth.

Example 36. The optical system of Example 34, wherein a difference between the second laser wavelength and the second peak wavelength is smaller than the second cavity linewidth.

Example 37. The optical system of Example 34, wherein a difference between the second peak wavelength and the second peak atomic wavelength is smaller than the second cavity linewidth.

Example 38. The optical system of Example 34, wherein a difference between the second laser wavelength and the second peak atomic wavelength is larger than the second atomic linewidth.

Example 39. The optical system of Example 30, wherein the spectral reflectivity of at least one of the third and the fourth reflective surfaces comprise two spectral regions having different reflectivities within the operating wavelength range of the optical system.

Example 40. The optical system of Example 39, wherein a reflectance of at least one of the third and the fourth reflective surfaces is larger than 70% for light having wavelengths smaller than a first cutoff wavelength and less than 20% for light having wavelengths larger than a second cutoff wavelength.

Example 41. The optical system of Example 39, wherein a reflectance of at least one of the third and the fourth reflective surfaces is less than 20% for light having wavelengths smaller than a first cutoff wavelength and larger than 70% for light having wavelengths larger than a second cutoff wavelength.

Example 42. The optical system of Example 39, wherein a reflectance of at least one of the third and the fourth reflective surfaces is larger than 70% for light having wavelengths larger than a first cutoff wavelength and smaller than a second cutoff wavelength that is larger than the first cutoff wavelength, less than 20% for light having wavelengths smaller than the first cutoff wavelength, and less than 20% for light having wavelengths larger than the second cutoff wavelength.

Example 43. The optical system of Example 30, wherein a cross-sectional area of the first input laser beam is larger than 50% of an area of the first reflective surface or a cross-sectional area of the second input laser beam is larger than 50% of an area of the third reflective surface.

Example 44. The optical system of Example 43, wherein a beam waist of the first input laser beam or the second input laser beam is smaller than 100 microns.

Example 45. The optical system of Example 43, wherein a beam waist of the first input laser beam or the second input laser beam is smaller than 1 millimeter.

Example 46. The optical system of Example 30, wherein the third and the fourth reflective surfaces have a spectral reflectivity comprising a first spectral region and second spectral region, and wherein:

- the reflectivity of the third and the fourth reflective surfaces for light having a wavelength within the first spectral region is lower than their reflectivity for light having a wavelength within the second spectral region;
- the second laser wavelength is within the second spectral region; and
- a cross-sectional area of the second input laser beam is larger than 50% of an area of the third reflective surface.

Example 47. The optical system of any of Example 46, further comprising a third laser source configured to generate a third input laser beam having a third laser wavelength within the first spectral region, wherein the third input laser beam is incident on the third reflective surface and a beam waist of the third input laser beam is smaller than 1 millimeter.

Example 48. The optical system of any of Example 47, wherein the beam waist of the third input laser beam is smaller than 1 micron.

Example 49. The optical system of any of Example 1, and 30 further comprising:

- a third laser source configured to generate a third input laser beam having a third laser wavelength, wherein:
- the third laser beam is incident on the first reflective surface and the third laser wavelength is within a third transmission peak of the first etalon, or
- the third laser beam is incident on the third reflective surface and the third laser wavelength is within a third transmission peak of the second etalon,
- a fourth laser source configured to generate a fourth input laser beam having a fourth wavelength, wherein the fourth input laser beam is incident on an absorptive wall of the EVC, said absorptive wall comprises a material that absorbs light having the fourth laser wavelength, and
- an electronic controller configured to control a temperature of the EVC by adjusting the power of the fourth laser source based at least in part on an electronic signal generated by a photodetector in response to receiving:
- a portion of the first laser beam transmitted through the first etalon or reflected by the first etalon, or
- a portion of the second laser beam transmitted through the second etalon or reflected by the first etalon.

Example 50. The optical system of Example 49, wherein the third and the fourth laser wavelengths are different from the first and/or the second atomic lines by at least 100 nm.

Example 51. The optical system of Examples 1 or 39, wherein reflectance of at least one of the first and the second reflective surfaces is larger than 70% for light having any wavelengths smaller than a first cutoff wavelength and larger than a lower bound wavelength, and less than 20% for light having any wavelengths larger than a second cutoff and smaller than an upper bound wavelength, wherein the second cutoff wavelength is larger than the first cutoff wavelength, and wherein a spectral distance between the first cutoff wavelength and the lower bound wavelength and the second cutoff wavelength and the upper bound wavelength is larger than 200 times a free spectral range of the first etalon.

Example 52. The optical system of Example for 39, wherein reflectance of at least one of the first and the second reflective surfaces is smaller than 20% for light having any wavelengths smaller than a first cutoff wavelength and larger than a lower bound wavelength, and larger than 70% for light having any wavelengths larger than a second cutoff wavelength and smaller than an upper bound wavelength, wherein the second cutoff wavelength is larger than the first cutoff wavelength, and wherein a spectral distance between the first cutoff wavelength and the lower bound wavelength and the second cutoff wavelength and the upper bound wavelength is larger than 200 times a free spectral range of the first etalon.

Example 53. The optical system of Example 1 or 39, wherein reflectance of the first and the second reflective surfaces is larger than 70% for light having any wavelengths larger than a first cutoff wavelength and smaller than a second cutoff wavelength that is larger than the first cutoff wavelength, less than 20% for light having any wavelengths smaller than the first cutoff wavelength and larger than a lower band wavelength, and less than 20% for light having any wavelengths larger than the second cutoff wavelength and smaller than an upper bound wavelength, wherein a spectral distance between the first cutoff wavelength and the lower bound wavelength and the second cutoff wavelength and the upper bound wavelength is larger than 200 times a free spectral range of the first etalon.

Example 54. The optical system of any of Examples 1-53, wherein the first atomic line comprises a first absorption line, the first peak atomic wavelength comprises a first peak absorption wavelength, and the first atomic linewidth comprises a first absorption linewidth.

Example 55. The optical system of any of Examples 1-53, wherein the first atomic line comprises a first polarization rotation line, the first peak atomic wavelength comprises a first peak polarization rotation wavelength, and the first atomic linewidth comprises a first polarization rotation linewidth.

Example 56. The optical system of any of Examples 1-53, wherein the first atomic line comprises a first EIT line, the first peak atomic wavelength comprises a first peak EIT wavelength, and the first atomic linewidth comprises a first EIT linewidth.

Example 57. The optical system of any of Examples 17-53, wherein the second atomic line comprises a second absorption line, the second peak atomic wavelength comprises a second peak absorption wavelength, and the second atomic linewidth comprises a second absorption linewidth.

Example 58. The optical system of any of Examples 17-53, wherein the second atomic line comprises a second polarization rotation line, the second peak atomic wavelength comprises a second peak polarization rotation wavelength, and the second atomic linewidth comprises a second polarization rotation linewidth.

Example 59. The optical system of any of Examples 17-53, wherein the second atomic line comprises a second EIT line, the second peak atomic wavelength comprises a second peak EIT wavelength, and the second atomic linewidth comprises a second EIT linewidth.

Example 60. An optical system comprising:
- a first laser source configured to generate a first input laser beam having a first laser wavelength;
- an etalon comprising:
- a first reflective surface,
- a second reflective surface,
- an optical cavity formed between the first reflective surface and the second reflective surface, the optical cavity having a plurality of transmission peaks and respective peak wavelengths, wherein a transmission peak of the plurality transmission peaks comprises a spectral region centered at a peak wavelength, the transmission peak having a cavity linewidth;
- a second laser source configured to generate a second input laser beam having a second laser wavelength, wherein the second input laser beam is incident on an absorptive wall of the etalon, said absorptive wall comprising a material that absorbs light having the second laser wavelength, and
- an electronic controller configured to control a power of the second laser source to adjust a temperature of the etalon;
- wherein the first input laser beam is incident on the first reflective surface; and
- wherein the first laser wavelength is within the first transmission peak.

Example 61. The optical system of Example 60, wherein the electronic controller controls the power of the second laser source based at least in part on an electronic signal generated by a photodetector in response to receiving a portion of the first laser beam transmitted through the etalon or reflected by the etalon.

Example 62. The optical system of Example 60, wherein the electronic controller controls the power of the second laser source based at least in part on an electronic signal generated by a photodetector in response to receiving a portion of the first laser beam transmitted through the etalon or reflected by the etalon.

Example 63. A method of measuring light-atom interaction, the method comprising:
- providing a first wavelength tunable laser source configured to generate a first input laser beam having a first laser wavelength;
- providing an etalon vapor cell (EVC) comprising:
  - a first reflective surface,
  - a second reflective surface,
  - a first etalon formed between the first reflective surface and the second reflective surface, the first etalon having a first length and a first plurality of transmission peaks and respective peak wavelengths, wherein a first transmission peak of the plurality transmission peaks comprises a spectral region centered at a first peak wavelength, the first transmission peak having a first cavity linewidth;
  - a chamber containing atoms, said atoms having a first atomic line, said first atomic line having a first atomic linewidth and a first peak atomic wavelength;
  - wherein the first length is configured such that the first transmission peak at least partially overlaps with the first atomic line; and
  - wherein an internal volume of the chamber at least partially overlaps with a resonant optical mode of the first etalon.
- directing the first input laser beam to the first reflective surface such that it becomes incident on the first reflective surface at a first angle of incidence;
- providing a temperature control system configured to at least control spectral positions of the first plurality of transmission peaks by controlling the temperature of the EVC;
- adjusting the first peak wavelength such that a spectral distance between the first peak atomic wavelength and the first peak wavelength is less than 10% of the first cavity linewidth.

Example 64. The method of Example 63, wherein adjusting the first peak wavelength comprises controlling the first peak wavelength using the temperature control system and/or adjusting the first angle of incidence.

Example 65. The method of Example 63, further comprising measuring a portion of the first input laser beam transmitted through the EVC via the first etalon, using a first photodetector.

Example 66. The method of Example 63, further comprising adjusting the first laser wavelength such that a spectral distance between the first peak atomic wavelength and the laser wavelength is less than 10% of the first atomic linewidth.

Example 67. The method of Example 63, further comprising adjusting the first laser wavelength such that a spectral distance between the first peak atomic wavelength and the laser wavelength is larger than 50% of the first atomic linewidth but less than 400% of the first atomic linewidth.

Example 68. The method of Example 63, further comprising providing a second wavelength tunable laser source configured to generate a second input laser beam having a second laser wavelength, wherein said atoms have a second atomic line, said second atomic line having a second atomic linewidth and a second peak atomic wavelength.

Example 69. The method of Example 68, further comprising directing the second input laser beam to the first reflective surface such that it becomes incident on the first reflective surface at a second angle of incidence.

Example 70. The method of Example 68, wherein a second transmission peak of the first plurality transmission peaks comprises a spectral region centered at a second peak wavelength, the second transmission peak having a second cavity linewidth, and wherein the method further comprises adjusting the second peak wavelength such that a spectral distance between the second peak atomic wavelength and the second peak wavelength is less than 10% of the second cavity linewidth.

Example 71. The method of Example 70, wherein adjusting the second peak wavelength comprises controlling the second peak wavelength using the temperature control system and/or adjusting the second angle of incidence.

Example 72. The method of Example 70, further comprising adjusting the second laser wavelength such that a spectral distance between the second peak wavelength and the second laser wavelength is less than 10% of the second cavity linewidth.

Example 73. The method of Example 70, further comprising adjusting the second laser wavelength such that a spectral distance between a second peak atomic wavelength and the second laser wavelength is less than 10% of the second atomic linewidth.

Example 74. The method of Example 70, wherein a reflectance of at least one of the first and the second reflective surfaces is larger than 70% for light having wavelengths within a first spectral region and less than 20% for light having wavelengths within a second spectral region, wherein the first and the second spectral regions are non-overlapping regions.

Example 75. The method of Example 74, further comprising adjusting the second laser wavelength such that the second laser wavelength is within the second spectral region.

Example 76. The method of Example 68, further comprising measuring a portion of the second input laser beam transmitted through the EVC via the first etalon, using a second photodetector.

Example 77. The method of Example 68, wherein the etalon vapor cell (EVC) further comprises:

a third reflective surface, a fourth reflective surface, a second etalon formed between the third reflective surface and the fourth reflective surface, the second etalon having a second length and a second plurality of transmission peaks and respective peak wavelengths, wherein a second transmission peak of the plurality transmission peaks comprises an spectral region centered at a second peak wavelength, the second transmission peak having a second cavity linewidth;

wherein the chamber further comprises the third and fourth reflective surfaces;

the method further comprising directing the second input laser beam to the third reflective surface such that it becomes incident on the third reflective surface at a second angle of incidence.

Example 78. The method of Examples 77, wherein the temperature control system is further configured to control the spectral position of the second plurality of transmission peaks by controlling the temperature of the EVC, and wherein the method further comprises adjusting the second peak wavelength using the temperature controller and/or the second angle of incidence such that a spectral distance between the second peak atomic wavelength and the second peak wavelength is less than 10% of the second cavity linewidth.

Example 79. The method of Example 77, further comprising adjusting the second laser wavelength such that a spectral distance between the second peak wavelength and the second laser wavelength is less than 10% of the second cavity linewidth.

Example 80. The method of Example 77, further comprising adjusting the second laser wavelength such that a spectral distance between the second peak atomic wavelength and the second laser wavelength is less than 10% of the second atomic linewidth.

Example 81. The method of Example 77, wherein a reflectance of at least one of the third and the fourth reflective surfaces is larger than 50% for light having wavelengths within a third spectral region and less than 10% for light having wavelengths within a fourth spectral region.

Example 82. The method of Example 81, further comprising adjusting the second laser wavelength such that the second laser wavelength is within the fourth spectral region.

Example 83. The method of Example 77, further comprising measuring a portion of the second input laser beam transmitted through the EVC via the first etalon, using a second photodetector.

Example 84. The method of any of Examples 63-83, wherein the first atomic line comprises a first absorption line.

Example 85. The method of any of Examples 63-83, wherein the first atomic line comprises a first EIT line.

Example 86. The method of any of Examples 63-83, wherein the first atomic line comprises a first polarization rotation line.

Example 87. The method of any of Examples 68-83, wherein the second atomic line comprises a second absorption line.

Example 88. The method of any of Examples 68-83, wherein the second atomic line comprises a second polarization rotation line.

Example 89. The method of any of Examples 68-83, wherein the second atomic line comprises a second EIT line.

Example 90. A method of fabricating an optical device, the method comprising:

providing a core layer having a top surface and a bottom surface substantially parallel to the bottom surface, said core layer comprising at least one opening extended from the top surface to the bottom surface;

providing a first layer having a first inner surface and a first outer surface, and disposing a first antireflection layer on a first region of the first inner surface;

providing a second layer having a second inner surface and a second outer surface, and disposing a second antireflection layer on a first region of the second inner surface;

bonding a second region of the first inner surface to the top surface; and bonding a second region of the second inner surface to the bottom surface;

wherein the first and second regions of the first inner region are non-overlapping, and wherein the first and second regions of the second inner surface are non-overlapping.

Example 91. The method of Example 90, further comprising filling the opening with a gas after bonding the first inner surface to the top surface and before bonding the second inner surface to the bottom surface.

Example 92. The method of Example 90, wherein boding comprises anodic bonding.

Example 93. The method of Example 90, further comprising disposing a first reflective layer on the first outer surface.

Example 94. The method of Example 93, further comprising disposing a second reflective layer on the second outer surface.

Example 95. The method of Example 94, wherein the reflectivity of the first and the second reflective layers is between 50% and 100%.

Example 96. A method of fabricating an optical device, the method comprising:

providing a core layer having a top surface and a bottom surface substantially parallel to the bottom surface, said core layer comprising at least one opening extended from the top surface to the bottom surface;

providing a first layer having a first inner surface and a first outer surface, and disposing a first reflective layer on a first region of the first inner surface;

providing a second layer having a second inner surface and a second outer surface, and disposing a second reflective layer on a first region of the second inner surface;

bonding a of the first inner surface to the top surface; and bonding a of the second inner surface to the bottom surface;

wherein the first and second regions of the first inner region are non-overlapping, and wherein the first and second regions of the second inner surface are non-overlapping.

Example 97. The method of Example 96, further comprising filling the opening with a gas after bonding the first inner surface to the top surface and before bonding the second inner surface to the bottom surface.

Example 98. The method of Example 96, wherein boding comprises anodic bonding.

Example 99. The method of Example 96, further comprising disposing a first antireflection layer on the first outer surface.

Example 100. The method of Example 96, further comprising disposing a second antireflection layer on the second outer surface.

Example 101. The method of Example 96, wherein the reflectivity of the first and the second reflective layers is between 50% and 100%.

Example 102. An optical device configured to allow interaction between one or more laser beams and atoms contained in the optical device, the optical device comprising:

a first reflective surface, a second reflective surface, at least one etalon formed between the first reflective surface and the second reflective surface, the first etalon having a roundtrip length and a plurality of transmission peaks and respective peak wavelengths, wherein a first transmission peak of the plurality transmission peaks comprises a spectral region centered at a first peak wavelength, the first transmission peak having a first cavity linewidth;

a chamber containing the atoms, said atoms having a first atomic line, said first atomic line having a first atomic linewidth and a first peak atomic wavelength, wherein an internal volume of the chamber at least partially overlaps with a resonant optical mode of the etalon; and wherein spectral reflectance of at least one of the first and the second reflective surfaces comprises at least one high reflectivity spectral region and a low reflectivity spectral region, wherein the reflectance of the at least one of the first and the second reflective surfaces for wavelengths within the high reflectivity spectral region is larger than 70% and the reflectance of the at least one of the first and the second reflective surfaces for wavelengths within the low reflectivity spectral region is smaller than 20%.

Example 103. The optical device of Example 102, wherein reflectance of at least one of the first and the second reflective surfaces is larger than 70% for light having any wavelengths smaller than a first cutoff wavelength and larger than a lower bound wavelength, and less than 20% for light having any wavelengths larger than a second cutoff and smaller than an upper bound wavelength, wherein the second cutoff wavelength is larger than the first cutoff wavelength, and wherein a spectral distance between the first cutoff wavelength and the lower bound wavelength and the second cutoff wavelength and the upper bound wavelength is larger than 200 times a free spectral range of the first etalon.

Example 104. The optical device of Example 102, wherein reflectance of at least one of the first and the second reflective surfaces is smaller than 20% for light having any wavelengths smaller than a first cutoff wavelength and larger than a lower bound wavelength, and larger than 70% for light having any wavelengths larger than a second cutoff wavelength and smaller than an upper bound wavelength, wherein the second cutoff wavelength is larger than the first cutoff wavelength, and wherein a spectral distance between the first cutoff wavelength and the lower bound wavelength and the second cutoff wavelength and the upper bound wavelength is larger than 200 times a free spectral range of the first etalon.

Example 105. The optical device of Example 102, wherein reflectance of the first and the second reflective surfaces is larger than 70% for light having any wavelengths larger than a first cutoff wavelength and smaller than a second cutoff wavelength that is larger than the first cutoff wavelength, less than 20% for light having any wavelengths smaller than the first cutoff wavelength and larger than a lower band wavelength, and less than 20% for light having any wavelengths larger than the second cutoff wavelength and smaller than an upper bound wavelength, wherein a spectral distance between the first cutoff wavelength and the lower bound wavelength and the second cutoff wavelength and the upper bound wavelength is larger than 200 times a free spectral range of the first etalon.

Example 106. The optical system of any of the Examples 1-59, wherein the chamber comprises the first and the second reflective surfaces.

Example 107. The method of any of the Examples 63-89, wherein the chamber comprises the first and the second reflective surfaces.

Example 108. The optical device of any of the Examples 102-105, wherein the chamber comprises the first and the second reflective surfaces.

Terminology

It will be understood that when the laser wavelength of an input laser beam is within an atomic linewidth, a spectral distance between the peak atomic wavelength (e.g., a peak absorption wavelength, a peak polarization rotation wavelength, or a peak EIT wavelength) of the atomic line and the laser wavelength can be less than 50%, 100%, 200%, 300% or 500% of the atomic linewidth.

It will be understood that when a laser line is aligned with an atomic line a spectral distance between the peak atomic wavelength of the atomic line and the laser wavelength can be less than 50%, 30%, or 1% of the atomic linewidth or any range formed by any of these values.

It will be understood that when the laser wavelength of an input laser beam is within a transmission peak of an etalon, a spectral distance between the peak wavelength of the transmission peak and the laser wavelength can be less than 50%, or 100% of the FWHM of the transmission peak (cavity linewidth) or any range formed by any of these values.

It will be understood that when a laser line is aligned with a transmission peak of an etalon, a spectral distance between the peak wavelength of the transmission peak and the laser wavelength can be less than 50%, 30%, or 1% of the FWHM of the transmission peak (cavity linewidth) or any range formed by any of these values.

It will be understood that when the peak atomic wavelength of the atomic line is within a transmission peak of an etalon, a spectral distance between the peak atomic wavelength of the atomic line and the peak wavelength of the transmission can be less than 50%, or 100% of the FWHM of the transmission peak (cavity linewidth) or any range formed by any of these values.

It will be understood that when an atomic line is aligned with a transmission peak of an etalon, a spectral distance between the peak atomic wavelength of the atomic line and the peak wavelength of the transmission can be less than 50%, 30%, or 1% of the FWHM of the transmission peak (cavity linewidth).

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is to be understood within the context used in general to convey that an item, term, etc. may be either X, Y, or Z. Thus, such conjunctive language is not generally intended to imply that certain embodiments require the presence of at least one of X, at least one of Y, and at least one of Z.

Language of degree, as used herein, such as the terms "approximately," "about," "generally," and "substantially," represent a value, amount, or characteristic close to the stated value, amount, or characteristic that still performs a desired function or achieves a desired result. For example, the terms "approximately," "about," "generally," and "substantially" may refer to an amount that is within ±10% of, within ±5% of, within ±2% of, within ±1% of, or within ±0.1% of the stated amount. As another example, the terms "generally parallel" and "substantially parallel" refer to a value, amount, or characteristic that departs from exactly parallel by ±10 degrees, by ±5 degrees, by ±2 degrees, by ±1 degree, or by ±0.1 degree, and the terms "generally perpendicular" and "substantially perpendicular" refer to a value, amount, or characteristic that departs from exactly perpendicular by ±10 degrees, by ±5 degrees, by ±2 degrees, by ±1 degree, or by ±0.1 degree.

Various configurations have been described above. Although the disclosed embodiments have been described with reference to these specific configurations, the designs and features described are not limited to these specific configurations. Various aspects of the devices and system described below may be modified for improved performance or implementation of a specific application. Thus, for example, in any method, configuration, or design disclosed herein, the acts or operations making up the method/process may be performed in any suitable sequence and are not necessarily limited to any particular disclosed sequence. Features or elements from various embodiments and examples discussed above may be combined with one another to produce alternative configurations compatible with embodiments disclosed herein. Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

What is claimed is:

1. An optical system comprising:

a first laser source configured to generate a first input laser beam having a first laser wavelength within an operating wavelength range of the optical system;

an etalon vapor cell (EVC) comprising:

a first reflective surface, a second reflective surface, a first etalon formed by the first reflective surface and the second reflective surface, the first etalon having a first length and a first plurality of transmission peaks and respective peak wavelengths, wherein a first transmission peak of the plurality transmission peaks comprises a spectral region centered at a first peak wavelength, the first transmission peak having a first cavity linewidth;

a chamber between the first and the second reflective surfaces, the chamber containing atoms, said atoms having a first atomic line, said first atomic line having a first atomic linewidth and a first peak atomic wavelength;

wherein the first input laser beam is incident on the first reflective surface;

wherein the first atomic line at least partially overlaps with the first transmission peak; and wherein the first laser wavelength is within the first transmission peak and the first atomic line;

an optical reflector configured to reflect a transmitted laser beam exiting the EVC via the second reflective surface back to the second reflective surface; and a photodetector configured to receive a reflected laser beam reflected from the first reflective surface of the EVC.

2. The optical system of claim 1, wherein a difference between the first laser wavelength and the first peak atomic wavelength is larger than the first atomic linewidth.

3. The optical system of claim 1, further comprising a first photodetector configured to receive a transmitted laser beam exiting the EVC via the second reflective surface.

4. The optical system of claim 1, further comprising a second laser source configured to generate a second input laser beam having a second laser wavelength different from the first laser wavelength, wherein the second input laser beam enters the chamber via a surface of the EVC.

5. The optical system of claim 4, wherein the second input laser beam is incident on the first reflective surface.

6. The optical system of claim 4, wherein the second laser wavelength is within the first atomic line.

7. The optical system of claim 4, wherein the second laser wavelength is within the first transmission peak of the first plurality of transmission peaks.

8. The optical system of claim 4, wherein:

the atoms further have a second atomic line, a second atomic linewidth, and a second peak atomic wavelength, and wherein the second laser wavelength is within the second atomic line.

9. The optical system of claim 8, wherein the second atomic line at least partially overlaps with a second transmission peak of the plurality of transmission peak.

10. The optical system of claim 9, wherein the second laser wavelength is within the second transmission peaks.

11. The optical system of claim 5, wherein:

The etalon vapor cell (EVC) further comprises:

a third reflective surface, a fourth reflective surface, a second etalon formed between the third reflective surface and the fourth reflective surface, the second etalon having a second length and a second plurality of transmission peaks and respective peak wavelengths, wherein a second transmission peak of the plurality transmission peaks comprises a spectral region centered at a second peak wavelength, the second transmission peak having a second cavity linewidth;

wherein the chamber further comprises the third and fourth reflective surfaces; wherein the second input laser beam is incident on the third reflective surface; and wherein the second laser wavelength is within the second transmission peak.

12. The optical system of claim 11, wherein the first length is different from the second length.

13. The optical system of claim 11, wherein the second laser wavelength is within the first atomic line.

14. The optical system of claim 11, wherein the atoms further have a second atomic line, a second atomic linewidth, and a second peak atomic wavelength.

15. The optical system of claim 14, wherein the second laser wavelength is within the second atomic line.

16. The optical system of claim 11, wherein the spectral reflectivity of at least one of the third and the fourth reflective surfaces comprise two spectral regions including a first spectral region and a second spectral region and having different reflectivities, wherein a reflectivity of the first spectral region does not exceed 50% of a reflectivity of the second spectral region for wavelengths within the operating wavelength range of the optical system.

17. The optical system of claim 11, wherein the third and the fourth reflective surfaces have a spectral reflectivity comprising a first spectral region and a second spectral region, and wherein:

the reflectivity of the third and the fourth reflective surfaces for light having a wavelength within the first spectral region is lower than their reflectivity for light having a wavelength within the second spectral region by at least 20%;

the second laser wavelength is within the second spectral region; and a cross-sectional area of the second input laser beam is larger than 50% of an area of the third reflective surface.

18. An optical system comprising:

a first laser source configured to generate a first input laser beam having a first laser wavelength within an operating wavelength range of the optical system;

an etalon vapor cell (EVC) comprising:

a first reflective surface, a second reflective surface, a first etalon formed by the first reflective surface and the second reflective surface, the first etalon having a first length and a first plurality of transmission peaks and respective peak wavelengths, wherein a first transmission peak of the plurality transmission peaks comprises a spectral region centered at a first peak wavelength, the first transmission peak having a first cavity linewidth;

a chamber between the first and the second reflective surfaces, the chamber containing atoms, said atoms having a first atomic line, said first atomic line having a first atomic linewidth and a first peak atomic wavelength;

wherein the first input laser beam is incident on the first reflective surface;

wherein the first atomic line at least partially overlaps with the first transmission peak;

wherein the first laser wavelength is within the first transmission peak and the first atomic line;

a second laser source configured to generate a second input laser beam having a second laser wavelength different from the first laser wavelength, wherein the second input laser beam enters the chamber via a surface of the EVC; and wherein at least one of the first and the second reflective surfaces has a spectral reflectivity comprising at least two spectral regions including a first spectral region and a second spectral region and having different reflectivities within the operating wavelength range of the optical system, wherein a reflectivity of the first spectral region does not exceed 50% of a reflectivity of the second spectral region for wavelengths within the operating wavelength range of the optical system.

19. An optical system comprising:

a first laser source configured to generate a first input laser beam having a first laser wavelength within an operating wavelength range of the optical system;

an etalon vapor cell (EVC) comprising:

a first reflective surface, a second reflective surface, a first etalon formed by the first reflective surface and the second reflective surface, the first etalon having a first length and a first plurality of transmission peaks and respective peak wavelengths, wherein a first transmission peak of the plurality transmission peaks comprises a spectral region centered at a first peak wavelength, the first transmission peak having a first cavity linewidth;

a chamber between the first and the second reflective surfaces, the chamber containing atoms, said atoms having a first atomic line, said first atomic line having a first atomic linewidth and a first peak atomic wavelength;

wherein the first input laser beam is incident on the first reflective surface;

wherein the first atomic line at least partially overlaps with the first transmission peak;

wherein the first laser wavelength is within the first transmission peak and the first atomic line;

a second laser source configured to generate a second input laser beam having a second laser wavelength different from the first laser wavelength, wherein the second input laser beam enters the chamber via a surface of the EVC;

wherein the first and the second reflective surfaces have a spectral reflectivity comprising a first spectral region and a second spectral region;

wherein the reflectivity of the first and the second reflective surfaces for light having a wavelength within the first spectral region is lower than their reflectivity for light having a wavelength within the second spectral region by at least 20%; and wherein the first laser wavelength is within the second spectral region and the second laser wavelength is within the first spectral region.

* * * * *